US012781945B2

(12) United States Patent
Seidl et al.

(10) Patent No.: US 12,781,945 B2
(45) Date of Patent: Nov. 3, 2026

(54) LIGHTING DEVICE

(71) Applicant: Schott AG, Mainz (DE)

(72) Inventors: Albrecht Seidl, Mainz (DE); Volker Hagemann, Mainz (DE)

(73) Assignee: SCHOTT AG, Mainz (DE)

( * ) Notice: Subject to any disclaimer, the term of this patent is extended or adjusted under 35 U.S.C. 154(b) by 173 days.

(21) Appl. No.: 18/450,705

(22) Filed: Aug. 16, 2023

(65) Prior Publication Data

US 2024/0060623 A1 Feb. 22, 2024

(30) Foreign Application Priority Data

Aug. 16, 2022 (DE) ..................... 10 2022 120 654.8

(51) Int. Cl.
*F21V 9/30* (2018.01)
*C09K 11/77* (2006.01)
(Continued)

(52) U.S. Cl.
CPC ............ *F21V 9/30* (2018.02); *C09K 11/7774* (2013.01); *F21V 7/30* (2018.02); *G01N 21/55* (2013.01); *G01N 2021/555* (2013.01)

(58) Field of Classification Search
CPC ............. G01N 2021/555; G01N 21/55; G01N 21/359; G01N 1/4005; G01N 2001/4016;
(Continued)

(56) References Cited

U.S. PATENT DOCUMENTS

| | | | | |
|---|---|---|---|---|
| 9,738,828 | B2 | 8/2017 | Hagemann et al. | |
| 10,364,962 | B2 * | 7/2019 | Sorg | F21V 9/30 |

(Continued)

FOREIGN PATENT DOCUMENTS

| | | | | |
|---|---|---|---|---|
| CN | 112180656 A | * | 1/2021 | C09K 11/681 |
| CN | 114641648 A | * | 6/2022 | F21V 9/30 |

(Continued)

OTHER PUBLICATIONS

V. Hagemann, A. Seidl, G. Weidmann, "Static ceramic phosphor assemblies for high power high luminance SSL-light sources for digital projection and specialty lighting", Proc of SPIE vol. 11302, 113021N-11, SPIE OPTO, San Francisco Feb. 25, 2020 (14 pages).

*Primary Examiner* — Michael P Stafira

(74) *Attorney, Agent, or Firm* — TAYLOR & EDELSTEIN, PC

(57) ABSTRACT

A lighting device includes: a light conversion unit including a light conversion element including a material containing an optically active element from lanthanoids, wherein:

the light conversion element includes a front side, a rear side, and a thickness (t), the light conversion element is set up for an irradiation on the front side with a primary light ($I_0$), for a diffuse reflectance of the primary light ($I_{REM}$), for a specular reflection of the primary light ($I_{FRE}$), and for a diffuse emission of a secondary light ($I_{EM}$) with an altered wavelength compared to the primary light, and the light conversion unit has a specific diffuse reflectance $SDR=t^{-1}\cdot I_{REM}/(I_0-I_{FRE})$, such that a luminous flux emitted by the light conversion unit at an irradiance limit of the light conversion unit with regard to a variation in the proportion of the optically active element is at most 4 $mm^{-1}$ away from a maximum.

20 Claims, 27 Drawing Sheets

(51) Int. Cl.
*F21V 7/30* (2018.01)
*G01N 21/55* (2014.01)

(58) Field of Classification Search
CPC .............. G01N 2021/6484; G01N 2021/8514; G01N 2035/00475; G01N 2035/1053; G01N 21/6445; G01N 21/645; G01N 35/10; F21V 29/70; F21V 9/30; F21V 9/32; F21V 7/30; F21V 7/0008; F21V 29/505; F21V 13/04; F21V 13/08; F21V 29/502; F21V 5/04; F21V 7/24; F21V 13/14; F21V 14/02; F21V 9/38; F21V 7/005; F21V 15/013; F21V 7/04; F21V 3/02; F21V 9/45; F21V 15/015; F21V 29/745; F21V 29/75; F21V 15/01; F21V 23/02; F21V 7/05; F21V 21/005; F21V 3/00; F21V 5/10; F21V 7/06; F21V 7/26; F21V 7/28; F21V 29/506; F21V 29/777; F21V 7/0091; F21V 2200/17; F21V 7/0016; F21V 7/043; F21V 9/08; F21V 23/002; F21V 23/006; F21V 23/007; F21V 29/74; F21V 29/85; F21V 3/062; F21V 5/041; F21V 7/0083; F21V 23/009; F21V 23/0442; F21V 7/0025; F21V 7/0066; F21V 7/22; F21V 9/02; F21V 9/06; F21V 9/40; F21V 11/00; F21V 25/12; F21V 29/50; F21V 29/86; F21V 29/89; F21V 3/061; F21V 33/0056; F21V 5/004; F21V 5/008; F21V 5/045; F21V 13/02; F21V 14/08; F21V 17/10; F21V 19/00; F21V 19/0055; F21V 23/0478; F21V 29/763; F21V 29/87; F21V 3/049; F21V 3/0625; F21V 5/00; F21V 5/007; F21V 5/02; F21V 5/08; F21V 7/00; F21V 7/09; F21V 17/101; F21V 19/003; F21V 21/02; F21V 3/04; F21V 3/08; F21V 7/10; F21V 13/06; F21V 17/02; F21V 17/104; F21V 21/03; F21V 23/004; F21V 23/008; F21V 23/023; F21V 23/026; F21V 23/0471; F21V 29/507; F21V 29/58; F21V 29/67; F21V 29/717; F21V 29/83; F21V 3/12; F21V 31/04; F21V 7/0033; F21V 7/045; F21V 7/046; F21V 9/12; F21V 11/06; F21V 11/14; F21V 13/12; F21V 17/12; F21V 19/0015; F21V 19/0065; F21V 23/003; F21V 23/005; F21V 23/0435; F21V 29/504; F21V 3/10; F21V 7/0058; F21V 7/041; F21V 7/08; F21V 9/14; F21V 9/20
See application file for complete search history.

(56) References Cited

U.S. PATENT DOCUMENTS

| | | | | |
|---|---|---|---|---|
| 11,480,316 | B2 * | 10/2022 | Patent | F21S 41/16 |
| 2018/0238520 | A1 | 8/2018 | Sorg et al. | |
| 2019/0062627 | A1 * | 2/2019 | Takasone | C04B 38/0061 |
| 2019/0195467 | A1 * | 6/2019 | Rozenburg | C04B 38/007 |
| 2021/0041084 | A1 * | 2/2021 | Gindele | F21V 9/32 |

FOREIGN PATENT DOCUMENTS

| | | | | | |
|---|---|---|---|---|---|
| CN | 114761728 | A | * | 7/2022 | F21V 29/502 |
| DE | 102019121518 | A1 | * | 2/2021 | F21V 9/40 |
| DE | 102012005654 | B4 | * | 3/2021 | C09K 11/77214 |
| JP | 2021028907 | A | * | 2/2021 | F21V 9/30 |
| WO | WO-2017220411 | A1 | * | 12/2017 | F21V 9/32 |
| WO | WO-2018193016 | A1 | * | 10/2018 | G02B 5/0825 |
| WO | WO-2018209819 | A1 | * | 11/2018 | G03B 21/204 |

* cited by examiner

FIG. 1A
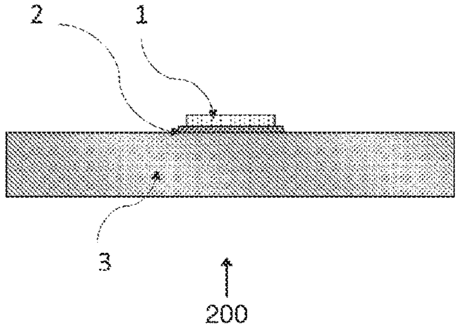
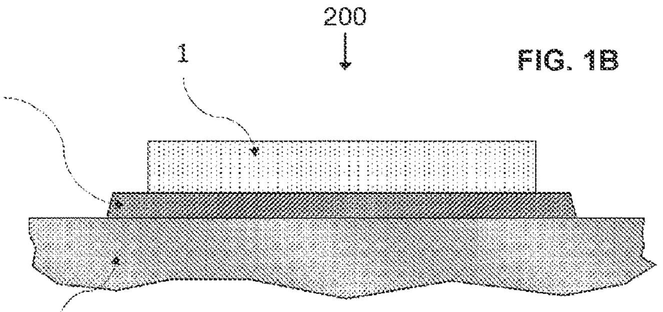
FIG. 1B
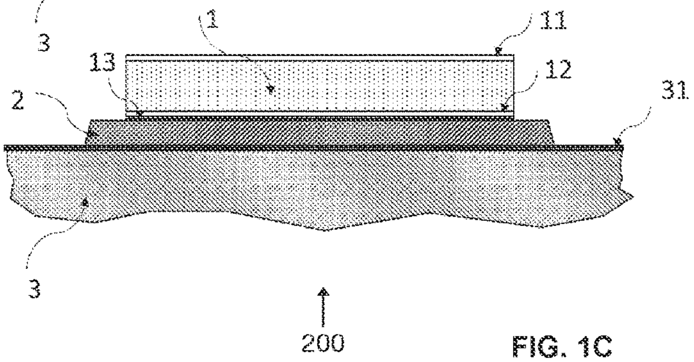
FIG. 1C

FIG. 8D
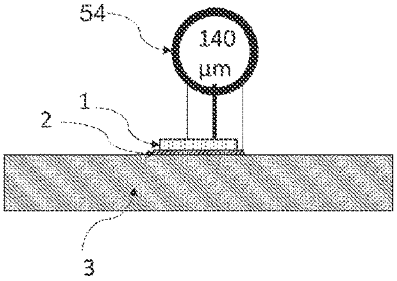
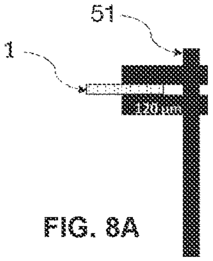
FIG. 8A
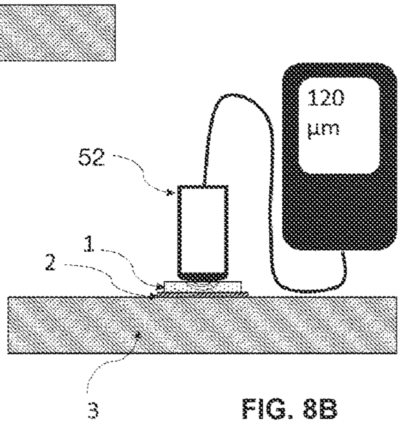
FIG. 8B
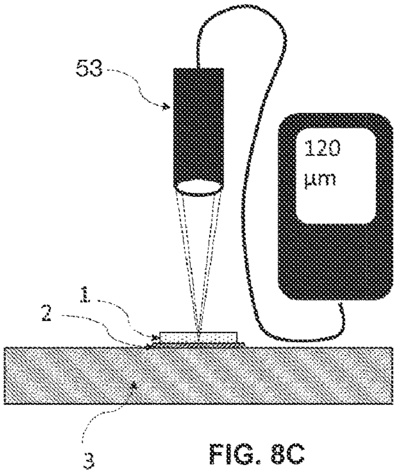
FIG. 8C

LIGHTING DEVICE

CROSS REFERENCE TO RELATED APPLICATIONS

This claims priority to German patent application no. 10 2022 120 654.8, filed Aug. 16, 2022, which is incorporated herein by reference.

BACKGROUND OF THE INVENTION

1. Field of the Invention

The present invention relates to a lighting device, and, more particularly, to a lighting device with a light conversion element.

2. Description of the Related Art

Known light conversion elements, also called converters hereinafter, especially ceramic converters or ceramic components, for lighting devices or corresponding components are generally optimized for high efficiency or efficacy at moderate incident laser power density (moderate irradiance). Typically, specified optical indices are ascertained at low laser power or power density: efficacy, emission color coordinates, and in the case of white light sources also full color coordinates. In some applications, however, the components are operated at much higher laser power or power density (irradiance).

The laser power emitted and the luminous flux emitted rise at first in a linear manner with increasing irradiance, then flatten out, and there is ultimately a rapid drop. No higher emitted light output or luminous flux is possible than at the maximum of possible irradiance, the irradiance limit. Even though components are not operated exactly at that point, a high irradiance limit does show that it is possible in principle to go to a relatively high irradiance and hence to achieve a relatively high light output.

However, it has been found that, surprisingly, converter materials or components having high to optimal efficiency (or high to optimal efficacy/light output/luminous flux) at moderate laser power no longer work optimally when operated close to the irradiance limit.

What is needed in the art is a lighting device, or a light conversion unit for a lighting device, that has been optimized for operation at high irradiance, especially for operation close to the irradiance limit. What is also needed in the art is to undertake optimization with regard to a high luminous efficiency. What is also needed in the art is to undertake optimization with regard to a good compromise between high luminous efficiency and high efficacy.

SUMMARY OF THE INVENTION

The invention relates to a lighting device having a light source for emission of primary light and a light conversion element that receives the primary light and emits secondary light with an altered wavelength compared to the primary light.

The present invention provides a lighting device including a light source for emitting primary light, especially in the form of a laser or light-emitting diode, optionally in the form of a laser, and a light conversion unit formed by or including a light conversion element, optionally a substrate and optionally a binder.

The light conversion element includes a material containing a proportion of at least one optically active element, especially from the group of lanthanoids. The light conversion element optionally includes at least one material containing at least one element selected from the group consisting of Ce, Eu, Pr, Tb and Sm.

The light conversion element has a front side, a rear side, and a thickness t extending from the front side to the rear side.

The optional substrate is joined directly or indirectly to the rear side of the light conversion element and is optionally in the form of a heat sink.

The optional binder is present between the light conversion element and the substrate and optionally takes the form of an organic adhesive, glass, ceramic adhesive, inorganic adhesive, sintered sinter paste and/or metallic solder compound, optionally of a metallic solder compound or sintered sinter paste, optionally of a metallic solder compound.

The light conversion element is set up for irradiation on its front side with the primary light ($I_0$) and for diffuse reflectance of primary light ($I_{REM}$), for specular reflection of primary light ($I_{FRE}$) and for diffuse emission of secondary light ($I_{EM}$) with an altered wavelength compared to the primary light.

The primary light is partly mirror-reflected at the surface, additionally penetrates partly into the converter, and is partly backscattered (reflected) there and partly converted and emitted as secondary light. What is expressed more particularly by the term "secondary light" is that conversion has taken place.

Specular reflection, also called directed mirror reflection, in this connection thus means the phenomenon of mirror reflection or Fresnel reflection. The incident light, i.e. the primary light, is mirror-reflected here at the surface of an object (here: the light conversion element, optionally provided with an antireflection coating). By contrast, the diffuse reflectance of the primary light relates to the undirected backscatter thereof.

The light conversion unit especially has a specific diffuse reflectance $SDR=t^{-1}\cdot I_{REM}/(I_0-I_{FRE})$ which is chosen such that the luminous flux emitted by the light conversion unit at the irradiance limit of the light conversion unit with regard to a variation in the proportion of the at least one optically active element is at most 4 $mm^{-1}$ away from a maximum, optionally at most 3.5 $mm^{-1}$, optionally at most 3 $mm^{-1}$.

Specific diffuse reflectance (SDR) is an experimentally measurable component characteristic of the light conversion unit, as set out in detail further down. Specific diffuse reflectance (SDR) may especially also be referred to as specific diffuse blue reflectance (SDBR). The terms are especially used synonymously in the context of this application.

Specific diffuse reflectance (SDR) is especially defined at an irradiance of the primary light ($I_0$) which is sufficiently small that, in the case of a variation of the irradiance, the luminous flux emitted by the light conversion unit increases in a linear manner with irradiance and/or that absorption and conversion are essentially unchanged by the heating associated with the irradiation and conversion. Specific diffuse reflectance (SDR) may be defined, for example, for an irradiance of less than 1 $W/mm^2$ or else less than $10^{-1}$ $W/mm^2$ or else less than $10^{-2}$ $W/mm^2$. Specific diffuse reflectance is thus defined especially for low powers, and not at the irradiance limit. This is set out in detail further down.

The solution to the problem is advantageously applicable irrespective of the manner of operation of the light conversion unit (incident blue laser radiation CW or pulsed, light conversion element as static component on a heat sink or in dynamic applications as a "ring on wheel").

In one further development of the present invention, the specific diffuse reflectance SDR of the light conversion unit may be chosen such that the luminous flux emitted by the light conversion unit at the irradiance limit of the light conversion unit with regard to a variation in the proportion of the at least one optically active element is at least 0.25 $mm^{-1}$ away from a maximum, optionally at least 0.5 $mm^{-1}$, optionally at least 0.75 $mm^{-1}$.

In this way, in particular, optimization is possible with regard to a good compromise between high luminous efficiency and high efficacy, as set out in detail further down.

The light conversion unit especially has a specific diffuse reflectance $SDR=t^{-1}\cdot I_{REM}/(I_0-I_{FRE})$ of greater than 0.1 $mm^{-1}$, optionally greater than 0.3 $mm^{-1}$, optionally greater than 0.5 $mm^{-1}$, optionally greater than 0.7 $mm^{-1}$, optionally greater than 0.8 $mm^{-1}$.

In one development of the present invention, the light conversion unit has a specific diffuse reflectance SDR of less than 7 $mm^{-1}$, optionally less than 5 $mm^{-1}$, optionally less than 3 $mm^{-1}$, optionally less than 2.5 $mm^{-1}$, optionally less than 2 $mm^{-1}$.

In this way, in turn, optimization is especially possible with regard to a good compromise between high luminous efficiency and high efficacy, as set out in detail further down.

It may be the case that the light conversion unit has at least one highly reflective layer or coating, wherein the highly reflective layer or coating is optionally a metallic layer or coating and/or a dielectric layer or coating, optionally an Ag or Ag-containing layer or coating.

It may be the case, for example, that the light conversion element has, on its rear side, a reflection layer, especially a metallic reflection layer, optionally including or composed of Ag, especially in such a way that the rear side of the light conversion element has been coated with the reflection layer, and wherein the reflection layer has optionally been applied on the rear side of the light conversion element by vapor deposition, sputtering (thin layer) or printing (thick layer).

In one embodiment, the light conversion element has a reflection layer which is a thin layer. The thin layer optionally includes or consists of Ag and/or has a layer thickness of 50 nm to 500 nm, optionally of 100 nm to 350 nm, optionally of 125 nm to 300 nm, optionally 150 nm to 250 nm. In some embodiments, the light conversion element has a thin layer including or consisting of Ag and a further thin layer including or consisting of Au. The further thin layer is optionally applied by vapor deposition or sputtering. The thin layer including or consisting of Au optionally has a layer thickness of 50 nm to 500 nm, optionally of 100 nm to 350 nm, optionally of 125 nm to 300 nm, optionally 150 nm to 250 nm. The thin layer including or consisting of Au may serve to protect the reflection layer including or consisting of Ag from oxidation reactions, which occur particularly at higher temperatures that can exist, for example, in the bonding of the light conversion element to the substrate, for example to a sinter paste.

In one embodiment, the light conversion element has a reflection layer which is an Ag-containing thick layer. The thick layer optionally has a layer thickness of 1 μm to 25 μm, optionally 5 μm to 20 μm, optionally of 10 μm to 15 μm.

The light conversion element may alternatively or additionally have been rendered reflective on its rear side with a dielectric layer system which is optimized particularly for maximum reflection.

The dielectric layer system may optionally be concluded on the outside by a metallic reflection layer. Accordingly, the layer sequence is converter element—dielectric layer system—metallic mirror layer.

Alternatively or additionally to a highly reflective coating on the rear side of the light conversion element, the light conversion element may be bonded on the rear side to a mirror, optionally to an Ag mirror or to a silver-coated substrate, where the mirror optionally constitutes the highly reflective layer and/or is formed by the substrate or has been applied to the substrate.

It may be the case that the light conversion unit includes at least one optical separation layer which is optionally between the at least one highly reflective layer and the rear side of the light conversion element, where the at least one optical separation layer is optionally transparent and/or has a lower refractive index than the refractive index of the light conversion element, where the at least one optical separation layer optionally includes or consists of $SiO_2$.

The optical separation layer optionally has a thickness below 5 μm, optionally below 3 μm, optionally in the range from 0.5 to 1.5 μm, optionally in the range from 0.8 to 1.2 μm.

The optical separation layer may serve to separate the reflection and any total reflection of the secondary light that reaches the rear side of the converter at the rear side of the converter from the reflection of the proportion of the secondary light that passes through the rear side of the converter at a highly reflective layer, especially at a metallic mirror.

It may be the case that, between the at least one highly reflective layer, optionally a metallic coating or metal-containing coating, and the optical separation layer, there is a transparent adhesion promoter layer, optionally including or consisting of one or more oxides selected from the group consisting of $SnO_2$, $TiO_2$, $Y_2O_3$ and $La_2O_3$, optionally $Y_2O_3$. Optionally, the adhesion promoter layer has a thickness of 1 nm or more and/or less than 100 nm, optionally less than 75 nm, optionally of less than 50 nm, optionally less than 35 nm and optionally of less than 20 nm.

The binder may be at least one organic adhesive, at least one glass, at least one ceramic adhesive, at least one inorganic adhesive, at least one sintered sinter paste and/or at least one metallic solder compound.

An option is given to providing a sintered sinter paste, e.g. pure Ag, which has a melting point exceeding 900 °C.

An option is given to providing a solder having a melting point below 300 °C.

An option is given to providing a solder including or consisting of an Au/Sn solder and/or AuSn8020, as set out in detail further down.

The binder may especially take the form of a bonding layer.

In an optional embodiment, the bonding layer is formed from at least one adhesive. Suitable adhesives are organic adhesives that have properties suitable for the specific use and the specific construction of the respective converter, for example with regard to thermal stability, thermal conductivity, transparency and curing characteristics.

An optional embodiment includes filled and unfilled epoxy resins and silicones. Bonding layers based on adhesives typically have a layer thickness of 5 to 70 μm, optionally 10 to 60 μm, more optionally 20 to 50 μm and optionally 30 to 50 μm.

In a further optional embodiment, the bonding layer is a glass, optionally selected from a solder glass or a thin glass.

A solder glass especially includes specific glasses having a comparatively low softening temperature of not more than 750 °C, optionally not more than 560 °C. In principle, glass solders may be used in various forms, for example as powder, as paste in a liquid medium, or embedded in a matrix, which is applied to the converter substrate or the converter component.

The applying can be effected by way of discharging a strand, by screenprinting, by spraying, or in loose powder form. Subsequently, the individual components of the converter are assembled.

In an optional embodiment, a paste containing glass powder is used, for example a PbO—, a Bi2O3-, a ZnO—, an SO3-, a B2O3- or a silicate-based glass, optionally a silicate-based glass.

Thin glass in the context of the present application is thin glass having a maximum thickness of not more than 50 µm and a softening temperature of not more than 750 °C, optionally not more than 560 °C. Such glasses may be positioned between converter component and converter substrate and be pressed together at a sufficiently high temperature and sufficiently high pressure. Suitable thin glasses include borosilicate glasses, available, for example, as D263® from SCHOTT.

Bonding layers based on glass have, for example, a layer thickness of 15 to 70 µm, optionally of 20 to 60 µm, and optionally 30 to 50 µm.

In another embodiment, the light conversion element is bonded to the substrate via a ceramic adhesive.

Such ceramic adhesives are typically essentially free of organic constituents and have high thermal stability. An option is given to choosing a ceramic adhesive such that the coefficient of thermal expansion and the mechanical properties, for example Young's modulus, of the resulting bonding layer are matched to the corresponding properties of the substrate and/or the converter.

Suitable ceramic adhesives are produced, for example, from an inorganic, optionally powdery, solid and a liquid medium, optionally water. The inorganic solid may include, for example, MgO—, $SiO_2$—, $TiO_2$—, $ZrO_2$— and/or $Al_2O_3$-based solids. An option is given to $SiO_2$—and/or $Al_2O_3$-based solids, optionally $Al_2O_3$-based solids. The pulverulent solid may additionally include further pulverulent components which, for example, assist the setting of the ceramic adhesive. These may include, for example, boric acid, borates or alkali metal silicates, such as sodium silicates.

Ceramic adhesives may, for example, be made up directly before use from the powdery solid and water, and cure at room temperature.

The solid here optionally has a median grain size d50 of 1 to 100 µm, optionally 10 to 50 µm. The ceramic adhesive optionally has a coefficient of thermal expansion of 5-15×$10^{-6}$ 1/K, optionally of 6 to 10×$10^{-6}$ 1/K. Suitable ceramic adhesives are produced, for example, from Resbond 920 or Resbond 940 HT (Polytec PT GmbH).

Bonding layers based on ceramic adhesives have, for example, a layer thickness of 50 to 500 µm, optionally of 100 to 350 µm, and optionally 150 to 300 µm.

In an advantageous embodiment, the binder is a metallic solder, optionally including an alloy of two or more metals. Suitable metallic solder compounds have a melting point lower than the melting point and/or the decomposition point of the individual constituents of the light conversion unit and/or higher than the maximum temperature of the light conversion element attained at the solder in operation. The melting point of the metallic solder compound is optionally between 150 °C to 450 °C, optionally between 180 °C to 320 °C and optionally between 200 to 300 °C. Suitable metallic solder binders are, for example, silver solders and gold solders, optionally Ag/Sn, Ag/Au and Au/Sn solders, optionally Au/Sn solders, for example AuSn8020.

The binder may take the form of a metallic solder having a melting point below 300 °C, where the solder optionally includes or consists of an Au/Sn solder and/or AuSn8020.

The binder may also take the form of a sintered sinter paste, optionally of an Ag-containing sinter paste.

The sintered sinter paste optionally has a layer thickness of 1 µm to 50 µm, optionally of 5 µm to 40 µm, optionally of 10 µm to 30 µm, optionally of 15 µm to 25 µm.

The sintered sinter paste optionally has a thermal conductivity of at least 50 W/mK, optionally at least 100 W/mK, optionally of at least 150 W/mK.

Especially in embodiments wherein the binder is a sintered sinter paste, it is advantageous that the surface of the light conversion element and the surface of the substrate that are bonded to one another have a coating. The light conversion element has optionally been provided with an Ag-containing thin layer, and optionally additionally with an Au-containing thin layer, or with a Cu-containing thin layer or an Ag-containing thick layer. Optional embodiments of the Ag-containing thin layer and of the Au-containing thin layer and of the Ag-containing thick layer are cited further up and are correspondingly applicable here. In advantageous embodiments, the surface of the substrate has a coating, where the coating is optionally an Au-containing coating and/or an NiP coating. The surface of the substrate has optionally been provided with an NiP layer, where the NiP layer optionally has a layer thickness of 1 µm to 10 µm, optionally 3 µm to 7 µm, and/or where the Au layer optionally has a layer thickness of 50 nm to 500 nm, optionally 100 nm to 400 nm, optionally 150 nm to 300 nm.

In embodiments in which the binder is a sintered sinter paste, the binding of the light conversion element and the substrate is effected according to the following steps:

a) providing a substrate and a light conversion element;
b) applying the sinter paste at least to a portion of the surface of the substrate and/or at least to a portion of the surface of the light conversion element;
c) contacting the surface of the substrate and the surface of the light conversion element, where at least a portion of the surface of the substrate and/or at least a portion of the surface of the light conversion element has been covered with the sinter paste;
d) sintering the composite obtained in step c).

In step a) of the method, a substrate and a light conversion element are provided. The surfaces of the substrate and/or of the light conversion element optionally have the coatings described in detail above.

In step b) a sinter paste is applied at least to a part of the surface of the substrate and/or at least to a part of the surface of the light conversion element. An option is given to applying a sinter paste at least to a part of the substrate. The dosage of the amount of sinter paste is typically such that, after the sintering step d), the sintered sinter paste has a layer thickness of 1 µm to 50 µm, optionally of 5 µm to 40 µm, optionally of 10 µm to 30 µm, optionally of 15 µm to 25 µm.

In step c), the surface of the substrate and the surface of the light conversion element are contacted with one another, where at least part of the surface of the substrate and/or at least part of the surface of the light conversion element is covered with the sinter paste.

Optionally, the surface of the light conversion element is contacted with a portion of the surface of the substrate, where the portion of the surface of the substrate has been at least partly covered with sinter paste. Advantageously, the contacting is effected with application of pressure, optionally at least 15 $mN/mm^2$, optionally more than 30 $mN/mm^2$, optionally more than 60 $mN/mm^2$.

In step d), the composite obtained in step c) is sintered. The sintering can be effected under an oxygen-containing atmosphere or under air or under a protective gas atmosphere, especially in an $N_2$ or Ar atmosphere. The sintering is effected at temperatures in the range from 180 °C to 300 °C.

The sinter paste optionally has a sintering temperature of not more than 300 °C, optionally not more than 280 °C, optionally not more than 250 °C. The sintering is optionally effected by heating the composite to the desired sintering temperature, advantageously by heating in a first step up to a first temperature, at optionally at least 0.5 K/min, optionally at least 0.75 K/min, and/or at not more than 3 K/min, optionally not more than 2 K/min. Optionally, the first temperature is in the range from 70 °C to 120 °C, optionally 80 °C to 105 °C. Optionally, after attainment of the first temperature, the temperature is maintained for 1 min to 60 min, optionally for 5 min to 45 min, optionally 20 min to 40 min. Optionally, in a second step, the composite is subsequently heated up to a second temperature, at optionally at least 1.0 K/min, optionally at least 1.5 K/min, and/or not more than 3.5 K/min, optionally not more than 3 K/min. The second temperature is optionally within a range from 180 °C to 300 °C, optionally 200 °C to 280 °C, and corresponds to the sintering temperature. Optionally, after the second temperature, i.e. the sintering temperature, has been attained, the temperature is maintained for at least 10 min, optionally at least 20 min or at least 30 min, and/or for not longer than 60 min, optionally not longer than 50 min or 40 min. This is followed by cooling of the composite, optionally to room temperature.

In embodiments in which the light conversion element has been bonded to a mirror on the rear side, optionally to an Ag mirror or to a silver-coated substrate, where the mirror is optionally formed by the substrate or has been applied to the substrate, it may be the case that binders are present between the mirror or the reflective substrate and the light conversion element, optionally including or composed of an optically transparent organic or inorganic adhesive and/or composed of a transparent material having a lower refractive index than the refractive index of the light conversion element, optionally an optically transparent organic adhesive having a lower refractive index than the refractive index of the light conversion element, where the binder optionally has a thickness in the region of not more than 30 μm, optionally in the range from 10 to 20 μm.

It may be the case that the surface of the light conversion element facing the incident light has been partly or fully provided with a single- or multilayer antireflection coating.

It may be the case that the bond strength of the light conversion element on the substrate, determinable in particular by a shear test according to MIL-STD-883F, Test 2019.7, is greater than 1 MPa, optionally greater than 10 MPa, optionally greater than 50 MPa. Examples of useful substances for this purpose include organic or inorganic adhesives, Ag sinter pastes and/or solders.

In particular, the light conversion element has a thickness of not more than 250 μm, optionally not more than 170 μm, optionally not more than 115 μm, optionally not more than 90 μm. It may also be the case that the thickness is not more than 80 μm. It may further be the case that the thickness is not less than 30 μm, especially not less than 50 μm, especially not less than 60 μm.

It may further be the case that the light conversion element together with the binder has a thickness of not more than 280 μm, optionally not more than 200 μm, optionally not more than 145 μm, optionally not more than 120 μm, and/or wherein the binder has a thickness of not more than 30 μm.

It may be the case that the light conversion element has an area of not more than 100 $mm^2$, optionally of not more than 25 $mm^2$, especially of not more than 16 $mm^2$, especially of not more than 9 $mm^2$, especially of not more than 4 $mm^2$, especially of not more than 1 $mm^2$, especially of not more than 0.75 $mm^2$.

The light conversion element may have a ratio of length to width of below 3, optionally of below 2, optionally of 1. This is especially true of static applications (e.g. "dies on heatsink").

The light conversion element may be ring-shaped, optionally with an external diameter between 20 and 200 mm, optionally between 35 and 88 mm. This is especially true of dynamic applications (e.g. "color wheels"). The ring-shaped light conversion element may also consist of multiple ring-shaped or part-ring-shaped segments.

The substrate may consist wholly or predominantly of a material having a thermal conductivity greater than 30 W/mK, optionally greater than 100 W/mK, yet more optionally greater than 150 W/mK, yet more optionally greater than 350 W/mK.

The substrate optionally includes at least one ceramic and/or at least one metal and/or at least one ceramic-metal composite. The substrate more optionally includes at least one metal, optionally selected from Cu, Al, Fe or Ni, especially Cu, for example Ni—P— and/or Au-coated Cu.

The substrate optionally has at least the same lateral dimensions as the light conversion element.

The light conversion element may consist wholly or predominantly of one or more materials of the composition $(A_{1-y} C_y)_3B_5O_{12}$ with A selected from one or more of the elements Y, Lu, Gd, and with B selected from one or more of the elements Al, Ga, and with C selected from one or more optically active elements selected from the group consisting of Ce, Eu, Pr, Tb and Sm, optionally Ce.

The material of the light conversion element may be wholly or partly a ceramic, also called optoceramic hereinafter.

The light conversion element may consist wholly or predominantly of a material of the composition $(A_{1-y} C_y)_3B_5O_{12}$ with A selected from one or more of the elements Y, Lu, Gd, and with B selected from one or more of the elements Al, Ga, and with C selected from one or more elements from the lanthanoids, optionally Ce.

It may further be the case that the light conversion element includes a first component consisting of one or more materials of the composition $(A_{1-y}C_y)_3B_5O_{12}$ with A selected from one or more of the elements Y, Lu, Gd, and with B selected from one or more of the elements Al, Ga, and with C selected from one or more elements from the lanthanoids, optionally Ce, and wherein the light conversion element includes a second component consisting of a material having higher thermal conductivity, optionally Al2O3, and wherein the light conversion element optionally consists solely of the aforementioned first and second components.

In one embodiment, the material of the light conversion element contains pores or other light-scattering inclusions or particles.

The material of the light conversion element is advantageously a monophasic, porous optoceramic, where the density of the optoceramic is optionally <99%, optionally <97%, and/or optionally >90%, optionally >93%. The median diameter of the pores, especially of the pores present in a cross section, is optionally between 100 nm and 3000 nm, optionally between 300 nm and 1500 nm, optionally between 400 nm and 1200 nm.

The median divides a dataset, i.e. a sample or a distribution, in the present case, for example, the diameter of the pores present in cross section, into two equal portions such that the values, i.e. the pore diameters, in one half are not greater than the median value, and in the other half are not less.

Some optional embodiments are detailed hereinafter, wherein the light-converting element is especially composed partly or wholly of one or more materials of the composition $(A_{1-y}C_y)_3B_5O_{12}$ with A selected from one or more of the elements Y, Lu, Gd, and with B selected from one or more of the elements Al, Ga, and with C selected from one or more elements from the lanthanoids, optionally Ce, and, if the light-converting element consists merely partly thereof, especially otherwise consists of or includes a material having higher thermal conductivity, optionally $Al_2O_3$.

In particular, the embodiments that follow are not limited to a garnet material class, and they are applicable especially to applications that are not directed, or directed to a lesser degree, at the reflected blue light, but rather at spectral components of greater wavelength, e.g. green and red, i.e. especially for applications in the field of projection.

One embodiment may be characterized by a thickness t of the light conversion element of not more than 90 μm and a coefficient of scatter s of the light conversion element, applicable to a wavelength of 600 nm, of 150 $cm^{-1}$<s<550 $cm^{-1}$ and a thermal conductivity 1 of the light conversion element, applicable to room temperature, of 5 $Wm^{-1}K^{-1}$<1<15 $Wm^{-1}K^{-1}$ and a Ce content y of the light conversion element of $y_{eff}$>0.0125 at %, optionally 0.50 at %>$y_{eff}$>0.0125 at %, optionally 0.20 at %>$y_{eff}$>0.0125 at %.

The "effective" Ce content $y_{eff}$ is calculated as follows: $y_{eff}=(1-z)\cdot y$ where z denotes the proportion by volume of the added component (e.g. aluminium oxide) in the case of a mixed ceramic. Further details in this regard are given further down.

One embodiment may be characterized by a thickness t of the light-converting element of 175 μm<t<250 μm and a coefficient of scatter s (applicable to a wavelength of 600 nm) of 150 $cm^{-1}$<s<550 $cm^{-1}$ and a thermal conductivity 1 (applicable to room temperature) of 5 $Wm^{-1}K^{-1}$<1<15 Wm-$K^{-1}$ and a Ce content y (based on the light-converting component in the converter) of $y_{eff}$>0.0125 at %, optionally 0.50 at %>$y_{eff}$>0.0125 at %, optionally 0.20 at %>$y_{eff}$>0.0125 at %.

One embodiment may be characterized by a thickness t of the light-converting element of 125 μm<t<175 μm and a coefficient of scatter s (applicable to a wavelength of 600 nm) of 150 $cm^{-1}$<s<550 $cm^{-1}$ and a thermal conductivity 1 (applicable to room temperature) of 5 $Wm^{-1}K^{-1}$<1<15 Wm-$K^{-1}$ and a Ce content y (based on the light-converting component in the converter) of $y_{eff}$>0.0125 at %, optionally 0.55 at %>$y_{eff}$>0.0125 at %, optionally 0.20 at %>$y_{eff}$>0.0125 at %.

One embodiment may be characterized by a thickness t of the light-converting element of 90 μm<t<125 μm and a coefficient of scatter s (applicable to a wavelength of 600 nm) of 150 $cm^{-1}$<s<550 $cm^{-1}$ and a thermal conductivity 1 (applicable to room temperature) of 5 $Wm^{-1}K^{-1}$<1<15 Wm-$K^{-1}$ and a Ce content y (based on the light-converting component in the converter) of $y_{eff}$>0.025 at %, optionally 0.60 at %>$y_{eff}$>0.025 at %, optionally 0.20 at %>$y_{eff}$>0.025 at %.

One embodiment may be characterized by a thickness t of the light-converting element of 70 μm<t<90 μm and a coefficient of scatter s (applicable to a wavelength of 600 nm) of 150 $cm^{-1}$<s<550 $cm^{-1}$ and a thermal conductivity 1 (applicable to room temperature) of 5 $Wm^{-1}K^{-1}$<1<15 Wm-$K^{-1}$ and a Ce content y (based on the light-converting component in the converter) of $y_{eff}$>0.05 at %, optionally 0.65 at %>$y_{eff}$>0.05 at %, optionally 0.30 at %>$y_{eff}$>0.05 at %.

One embodiment may be characterized by a thickness t of the light-converting element of 50 μm<t<70 μm and a coefficient of scatter s (applicable to a wavelength of 600 nm) of 150 $cm^{-1}$<s<550 $cm^{-1}$ and a thermal conductivity 1 (applicable to room temperature) of 5 $Wm^{-1}K^{-1}$<1<15 Wm-$K^{-1}$ and a Ce content y (based on the light-converting component in the converter) of $y_{eff}$>0.1 at %, optionally 0.70 at %>$y_{eff}$>0.1 at %, optionally 0.50 at %>$y_{eff}$>0.1 at %.

One embodiment may be characterized by a thickness t of the light-converting element of 175 μm<t<250 μm and a coefficient of scatter s (applicable to a wavelength of 600 nm) of 550 $cm^{-1}$<s<950 $cm^{-1}$ and a thermal conductivity 1 (applicable to room temperature) of 5 $Wm^{-1}K^{-1}$<1<15 Wm-$K^{-1}$ and a Ce content y (based on the light-converting component in the converter) of $y_{eff}$>0.0125 at %, optionally 0.40 at %>$y_{eff}$>0.0125 at %, optionally 0.10 at %>$y_{eff}$>0.0125 at %.

One embodiment may be characterized by a thickness t of the light-converting element of 125 μm<t<175 μm and a coefficient of scatter s (applicable to a wavelength of 600 nm) of 550 $cm^{-1}$<s<950 $cm^{-1}$ and a thermal conductivity 1 (applicable to room temperature) of 5 $Wm^{-1}K^{-1}$<1<15 Wm-$K^{-1}$ and a Ce content y (based on the light-converting component in the converter) of $y_{eff}$>0.0125 at %, optionally 0.45 at %>$y_{eff}$>0.0125 at %, optionally 0.10 at %>$y_{eff}$>0.0125 at %.

One embodiment may be characterized by a thickness t of the light-converting element of 90 μm<t<125 μm and a coefficient of scatter s (applicable to a wavelength of 600 nm) of 550 $cm^{-1}$<s<950 $cm^{-1}$ and a thermal conductivity 1 (applicable to room temperature) of 5 $Wm^{-1}K^{-1}$<1<15 Wm-$K^{-1}$ and a Ce content y (based on the light-converting component in the converter) of $y_{eff}$>0.025 at %, optionally 0.50 at %>$y_{eff}$>0.025 at %, optionally 0.10 at %>$y_{eff}$>0.025 at %.

One embodiment may be characterized by a thickness t of the light-converting element of 70 μm<t<90 μm and a coefficient of scatter s (applicable to a wavelength of 600 nm) of 550 $cm^{-1}$<s<950 $cm^{-1}$ and a thermal conductivity 1 (applicable to room temperature) of 5 $Wm^{-1}K^{-1}$<1<15 Wm-$K^{-1}$ and a Ce content y (based on the light-converting component in the converter) of $y_{eff}$>0.05 at %, optionally 0.55 at %>$y_{eff}$>0.05 at %, optionally 0.20 at %>$y_{eff}$>0.05 at %.

One embodiment may be characterized by a thickness t of the light-converting element of 50 μm<t<70 μm and a coefficient of scatter s (applicable to a wavelength of 600 nm) of 550 $cm^{-1}$<s<950 $cm^{-1}$ and a thermal conductivity 1 (applicable to room temperature) of 5 $Wm^{-1}K^{-1}$<1<15 $Wm^{-1}K^{-1}$ and a Ce content y (based on the light-converting component in the converter) of $y_{eff}$>0.1 at %, optionally 0.60 at %>$y_{eff}$>0.1 at %, optionally 0.40 at %>$y_{eff}$>0.1 at %.

One embodiment may be characterized by a thickness t of the light-converting element of 175 μm<t<250 μm and a coefficient of scatter s (applicable to a wavelength of 600 nm) of 150 $cm^{-1}$<s<550 $cm^{-1}$ and a thermal conductivity 1 (applicable to room temperature) of 15 $Wm^{-1}K^{-1}$<1<30 $Wm^{-1}K^{-1}$ and a Ce content y (based on the light-converting component in the converter) of $y_{eff}$>0.0125 at %, optionally 1.0 at %>$y_{eff}$>0.0125 at %, optionally 0.40 at %>$y_{eff}$>0.0125 at %.

One embodiment may be characterized by a thickness t of the light-converting element of 125 μm<t<175 μm and a coefficient of scatter s (applicable to a wavelength of 600 nm) of 150 $cm^{-1}$<s<550 $cm^{-1}$ and a thermal conductivity 1 (applicable to room temperature) of 15 $Wm^{-1}K^{-1}$<1<30 Wm-$K^{-1}$ and a Ce content y (based on the light-converting component in the converter) of $y_{eff}$>0.0125 at %, optionally 1.1 at %>$y_{eff}$>0.0125 at %, optionally 0.40 at %>$y_{eff}$>0.0125 at %.

One embodiment may be characterized by a thickness t of the light-converting element of 90 μm<t<125 μm and a coefficient of scatter s (applicable to a wavelength of 600 nm) of 150 $cm^{-1}$<s<550 $cm^{-1}$ and a thermal conductivity 1 (applicable to room temperature) of 15 $Wm^{-1}K^{-1}$<1<30 Wm-$K^{-1}$ and a Ce content y (based on the light-converting component in the converter) of $y_{eff}$>0.025 at %, optionally 1.2 at %>$y_{eff}$>0.025 at %, optionally 0.40 at %>$y_{eff}$>0.025 at %.

One embodiment may be characterized by a thickness t of the light-converting element of 70 μm<t<90 μm and a coefficient of scatter s (applicable to a wavelength of 600 nm) of 150 $cm^{-1}$<s<550 $cm^{-1}$ and a thermal conductivity 1 (applicable to room temperature) of 15 $Wm^{-1}K^{-1}$<1<30 Wm-$K^{-1}$ and a Ce content y (based on the light-converting component in the converter) of $y_{eff}$>0.05 at %, optionally 1.3 at %>$y_{eff}$>0.05 at %, optionally 0.60 at %>$y_{eff}$>0.05 at %.

One embodiment may be characterized by a thickness t of the light-converting element of 50 μm<t<70 μm and a coefficient of scatter s (applicable to a wavelength of 600 nm) of 150 $cm^{-1}$<s<550 $cm^{-1}$ and a thermal conductivity 1 (applicable to room temperature) of 15 $Wm^{-1}K^{-1}$<1<30 Wm-$K^{-1}$ and a Ce content y (based on the light-converting component in the converter) of $y_{eff}$>0.1 at %, optionally 1.4 at %>$y_{eff}$>0.1 at %, optionally 1.0 at %>$y_{eff}$>0.1 at %.

One embodiment may be characterized by a thickness t of the light-converting element of 175 μm<t<250 μm and a coefficient of scatter s (applicable to a wavelength of 600 nm) of 550 $cm^{-1}$<s<950 $cm^{-1}$ and a thermal conductivity 1 (applicable to room temperature) of 15 $Wm^{-1}K^{-1}$<1<30 Wm-$K^{-1}$ and a Ce content y (based on the light-converting component in the converter) of $y_{eff}$>0.0125 at %, optionally 0.80 at %>$y_{eff}$>0.0125 at %, optionally 0.20 at %>$y_{eff}$>0.0125 at %.

One embodiment may be characterized by a thickness t of the light-converting element of 125 μm<t<175 μm and a coefficient of scatter s (applicable to a wavelength of 600 nm) of 550 $cm^{-1}$<s<950 $cm^{-1}$ and a thermal conductivity 1 (applicable to room temperature) of 15 $Wm^{-1}K^{-1}<1<30\ Wm^{-1}K^{-1}$ and a Ce content y (based on the light-converting component in the converter) of $y_{eff}>0.0125$ at %, optionally 0.90 at %$>y_{eff}>0.0125$ at %, optionally 0.20 at %$>y_{eff}>0.0125$ at %.

One embodiment may be characterized by a thickness t of the light-converting element of 90 μm<t<125 μm and a coefficient of scatter s (applicable to a wavelength of 600 nm) of 550 $cm^{-1}<s<950\ cm^{-1}$ and a thermal conductivity 1 (applicable to room temperature) of 15 $Wm^{-1}K^{-1}<1<30\ Wm\text{-}K^{-1}$ and a Ce content y (based on the light-converting component in the converter) of $y_{eff}>0.025$ at %, optionally 1.0 at %$>y_{eff}>0.025$ at %, optionally 0.20 at %$>y_{eff}>0.025$ at %.

One embodiment may be characterized by a thickness t of the light-converting element of 70 μm<t<90 μm and a coefficient of scatter s (applicable to a wavelength of 600 nm) of 550 $cm^{-1}<s<950\ cm^{-1}$ and a thermal conductivity 1 (applicable to room temperature) of 15 $Wm^{-1}K^{-1}<1<30\ Wm^{-1}K^{-1}$ and a Ce content y (based on the light-converting component in the converter) of $y_{eff}>0.05$ at %, optionally 1.1 at %$>y_{eff}>0.05$ at %, optionally 0.40 at %$>y_{eff}>0.05$ at %.

One embodiment may be characterized by a thickness t of the light-converting element of 50 μm<t<70 μm and a coefficient of scatter s (applicable to a wavelength of 600 nm) of 550 $cm^{-1}<s<950\ cm^{-1}$ and a thermal conductivity 1 (applicable to room temperature) of 15 $Wm^{-1}K^{-1}<1<30\ Wm\text{-}K^{-1}$ and a Ce content y (based on the light-converting component in the converter) of $y_{eff}>0.1$ at %, optionally 1.2 at %$>y_{eff}>0.1$ at %, more optionally 0.80 at %$>y_{eff}>0.1$ at %.

Some optional embodiments are detailed hereinafter, wherein the light-converting element is especially composed partly or wholly of one or more materials of the composition $(A_{1-y}C_y)_3B_5O_{12}$ with A selected from one or more of the elements Y, Lu, Gd, and with B selected from one or more of the elements Al, Ga, and with C selected from one or more elements from the lanthanoids, optionally Ce, and, if the light-converting element consists merely partly thereof, especially otherwise consists of or includes a material having higher thermal conductivity, optionally $Al_2O_3$.

In particular, the embodiments that follow are not restricted to a garnet material class and they are especially applicable to applications in which the reflected blue light is utilized, i.e. especially for what are called white light sources of a particular color temperature CCT [K].

One embodiment may be characterized by a thickness t of the light conversion element of not more than 170 μm and a coefficient of scatter s of the light conversion element, applicable to a wavelength of 600 nm, of 150 $cm^{-1}<s<550\ cm^{-1}$ and a color temperature CCT>5500 K and a Ce content y of the light conversion element of $y_{eff}>0.025$ at %, optionally 0.25 at %$>y_{eff}>0.025$ at %, optionally 0.15 at %$>y_{eff}>0.025$ at %.

One embodiment may be characterized by a thickness t of the light conversion element of not more than 170 μm and a coefficient of scatter s of the light conversion element, applicable to a wavelength of 600 nm, of 150 $cm^{-1}<s<550\ cm^{-1}$ and a color temperature 4000<CCT<5500 K and a Ce content y (based on the light-converting component in the converter) of $y_{eff}>0.025$ at %, optionally 0.50 at %$>y_{eff}>0.025$ at %, optionally 0.35 at %$>y_{eff}>0.025$ at %.

The present invention further relates to a light conversion unit formed by or including a light conversion element, optionally a substrate and optionally a binder.

The "effective" Ce content $y_{eff}$ is calculated as follows: $y_{eff}=(\mathbf{1}\text{-}z)\text{-}y$ where z denotes the proportion by volume of the added component (e.g. aluminium oxide) in the case of a mixed ceramic. Further details in this regard are given further down.

One embodiment may be characterized by a thickness t of the light-converting element of 175 μm<t<250 μm and a coefficient of scatter s (applicable to a wavelength of 600 nm) of 150 $cm^{-1}<s<550\ cm^{-1}$ and a color temperature CCT>5500 K and a Ce content y (based on the light-converting component in the converter) of $y_{eff}>0.025$ at %, optionally 0.25 at %$>y_{eff}>0.025$ at %, optionally 0.15 at %$>y_{eff}>0.025$ at %.

One embodiment may be characterized by a thickness t of the light-converting element of 125 μm<t<175 μm and a coefficient of scatter s (applicable to a wavelength of 600 nm) of 150 $cm^{-1}<s<550\ cm^{-1}$ and a color temperature CCT>5500 K and a Ce content y (based on the light-converting component in the converter) of $y_{eff}>0.025$ at %, optionally 0.30 at %$>y_{eff}>0.025$ at %, optionally 0.15 at %$>y_{eff}>0.025$ at %.

One embodiment may be characterized by a thickness t of the light-converting element of 90 μm<t<125 μm and a coefficient of scatter s (applicable to a wavelength of 600 nm) of 150 $cm^{-1}<s<550\ cm^{-1}$ and a color temperature CCT>5500 K and a Ce content y (based on the light-converting component in the converter) of $y_{eff}>0.05$ at %, optionally 0.35 at %$>y_{eff}>0.05$ at %, optionally 0.15 at %$>y_{eff}>0.05$ at %.

One embodiment may be characterized by a thickness t of the light-converting element of 70 μm<t<90 μm and a coefficient of scatter s (applicable to a wavelength of 600 nm) of $150\ cm^{-1}<s<550\ cm^{-1}$ and a color temperature CCT>5500 K and a Ce content y (based on the light-converting component in the converter) of $y_{eff}>0.08$ at %, optionally 0.40 at $\%>y_{eff}>0.08$ at %, optionally 0.20 at $\%>y_{eff}>0.08$ at %.

One embodiment may be characterized by a thickness t of the light-converting element of 50 µm<t<70 µm and a coefficient of scatter s (applicable to a wavelength of 600 nm) of $150\ cm^{-1}<s<550\ cm^{-1}$ and a color temperature CCT>5500 K and a Ce content y (based on the light-converting component in the converter) of $y_{eff}>0.1$ at %, optionally 0.45 at $\%>y_{eff}>0.1$ at %, optionally 0.25 at $\%>y_{eff}>0.1$ at %.

One embodiment may be characterized by a thickness t of the light-converting element of 175 µm<t<250 µm and a coefficient of scatter s (applicable to a wavelength of 600 nm) of $450\ cm^{-1}<s<950\ cm^{-1}$ and a color temperature CCT>5500 K and a Ce content y (based on the light-converting component in the converter) of $y_{eff}>0.025$ at %, optionally 0.35 at $\%>y_{eff}>0.025$ at %, optionally 0.25 at $\%>y_{eff}>0.025$ at %.

One embodiment may be characterized by a thickness t of the light-converting element of 125 µm<t<175 µm and a coefficient of scatter s (applicable to a wavelength of 600 nm) of $450\ cm^{-1}<s<950\ cm^{-1}$ and a color temperature CCT>5500 K and a Ce content y (based on the light-converting component in the converter) of $y_{eff}>0.025$ at %, optionally 0.40 at $\%>y_{eff}>0.025$ at %, optionally 0.25 at $\%>y_{eff}>0.025$ at %.

One embodiment may be characterized by a thickness t of the light-converting element of 90 µm<t<125 µm and a coefficient of scatter s (applicable to a wavelength of 600 nm) of $450\ cm^{-1}<s<950\ cm^{-1}$ and a color temperature CCT>5500 K and a Ce content y (based on the light-converting component in the converter) of $y_{eff}>0.05$ at %, optionally 0.45 at $\%>y_{eff}>0.05$ at %, optionally 0.25 at $\%>y_{eff}>0.05$ at %.

One embodiment may be characterized by a thickness t of the light-converting element of 70 µm<t<90 µm and a coefficient of scatter s (applicable to a wavelength of 600 nm) of $450\ cm^{-1}<s<950\ cm^{-1}$ and a color temperature CCT>5500 K and a Ce content y (based on the light-converting component in the converter) of $y_{eff}>0.08$ at %, optionally 0.50 at $\%>y_{eff}>0.08$ at %, optionally 0.30 at $\%>y_{eff}>0.08$ at %.

One embodiment may be characterized by a thickness t of the light-converting element of 50 µm<t<70 µm and a coefficient of scatter s (applicable to a wavelength of 600 nm) of $450\ cm^{-1}<s<950\ cm^{-1}$ and a color temperature CCT>5500 K and a Ce content y (based on the light-converting component in the converter) of $y_{eff}>0.1$ at %, optionally 0.55 at $\%>y_{eff}>0.1$ at %, optionally 0.35 at $\%>y_{eff}>0.1$ at %.

One embodiment may be characterized by a thickness t of the light-converting element of 175 µm<t<250 µm and a coefficient of scatter s (applicable to a wavelength of 600 nm) of $150\ cm^{-1}<s<550\ cm^{-1}$ and a color temperature 5500 K>CCT>4000 K and a Ce content y (based on the light-converting component in the converter) of $y_{eff}>0.025$ at %, optionally 0.45 at $\%>y_{eff}>0.025$ at %, optionally 0.35 at $\%>y_{eff}>0.025$ at %.

One embodiment may be characterized by a thickness t of the light-converting element of 125 µm<t<175 µm and a coefficient of scatter s (applicable to a wavelength of 600 nm) of $150\ cm^{-1}<s<550\ cm^{-1}$ and a color temperature 5500 K>CCT>4000 K and a Ce content y (based on the light-converting component in the converter) of $y_{eff}>0.025$ at %, optionally 0.50 at $\%>y_{eff}>0.025$ at %, optionally 0.35 at $\%>y_{eff}>0.025$ at %.

One embodiment may be characterized by a thickness t of the light-converting element of 90 µm<t<125 µm and a coefficient of scatter s (applicable to a wavelength of 600 nm) of $150\ cm^{-1}<s<550\ cm^{-1}$ and a color temperature 5500 K>CCT>4000 K and a Ce content y (based on the light-converting component in the converter) of $y_{eff}>0.05$ at %, optionally 0.55 at $\%>y_{eff}>0.05$ at %, optionally 0.35 at $\%>y_{eff}>0.05$ at %.

One embodiment may be characterized by a thickness t of the light-converting element of 70 µm<t<90 µm and a coefficient of scatter s (applicable to a wavelength of 600 nm) of $150\ cm^{-1}<s<550\ cm^{-1}$ and a color temperature 5500 K>CCT>4000 K and a Ce content y (based on the light-converting component in the converter) of $y_{eff}>0.08$ at %, optionally 0.60 at $\%>y_{eff}>0.08$ at %, optionally 0.40 at $\%>y_{eff}>0.08$ at %.

One embodiment may be characterized by a thickness t of the light-converting element of 50 μm<t<70 μm and a coefficient of scatter s (applicable to a wavelength of 600 nm) of 150 $cm^{-1}$<s<550 $cm^{-1}$ and a color temperature 5500 K>CCT>4000 K and a Ce content y (based on the light-converting component in the converter) of $y_{eff}$>0.1 at %, optionally 0.65 at %>$y_{eff}$>0.1 at %, optionally 0.45 at %>$y_{eff}$>0.1 at %.

One embodiment may be characterized by a thickness t of the light-converting element of 175 μm<t<250 μm and a coefficient of scatter s (applicable to a wavelength of 600 nm) of 450 $cm^{-1}$<s<950 $cm^{-1}$ and a color temperature 5500 K>CCT>4000 K and a Ce content y (based on the light-converting component in the converter) of $y_{eff}$>0.025 at %, optionally 0.55 at %>$y_{eff}$>0.025 at %, optionally 0.45 at %>$y_{eff}$>0.025 at %.

One embodiment may be characterized by a thickness t of the light-converting element of 125 μm<t<175 μm and a coefficient of scatter s (applicable to a wavelength of 600 nm) of 450 $cm^{-1}$<s<950 $cm^{-1}$ and a color temperature 5500 K>CCT>4000 K and a Ce content y (based on the light-converting component in the converter) of $y_{eff}$>0.025 at %, optionally 0.60 at %>$y_{eff}$>0.025 at %, optionally 0.45 at %>$y_{eff}$>0.025 at %.

One embodiment may be characterized by a thickness t of the light-converting element of 90 μm<t<125 μm and a coefficient of scatter s (applicable to a wavelength of 600 nm) of 450 $cm^{-1}$<s<950 $cm^{-1}$ and a color temperature 5500 K>CCT>4000 K and a Ce content y (based on the light-converting component in the converter) of $y_{eff}$>0.05 at %, optionally 0.65 at %>$y_{eff}$>0.05 at %, optionally 0.45 at %>$y_{eff}$>0.05 at %.

One embodiment may be characterized by a thickness t of the light-converting element of 70 μm<t<90 μm and a coefficient of scatter s (applicable to a wavelength of 600 nm) of 450 $cm^{-1}$<s<950 $cm^{-1}$ and a color temperature 5500 K>CCT>4000 K and a Ce content y (based on the light-converting component in the converter) of $y_{eff}$>0.08 at %, optionally 0.70 at %>$y_{eff}$>0.08 at %, optionally 0.50 at %>$y_{eff}$>0.08 at %.

One embodiment may be characterized by a thickness t of the light-converting element of 50 μm<t<70 μm and a coefficient of scatter s (applicable to a wavelength of 600 nm) of 450 $cm^{-1}$<s<950 $cm^{-1}$ and a color temperature 5500 K>CCT>4000 K and a Ce content y (based on the light-converting component in the converter) of $y_{eff}$>0.1 at %, optionally 0.75 at %>$y_{eff}$>0.1 at %, optionally 0.55 at %>$y_{eff}$>0.1 at %.

The light conversion element includes a material containing a proportion of at least one optically active element from the group of lanthanoids.

The light conversion element has a front side, a rear side, and a thickness t extending from the front side to the rear side.

The optional substrate is bonded directly or indirectly to the rear side of the light conversion element and takes the form, for example, of a heat sink.

The optional binder is present between the light conversion element and the substrate and optionally takes the form of an organic adhesive, glass, ceramic adhesive, inorganic adhesive, sintered sinter paste and/or metallic solder compound, optionally of a metallic solder compound or sintered sinter paste, optionally of a metallic solder compound.

The light conversion element is set up for irradiation on its front side with the primary light ($I_0$) and for diffuse reflectance of primary light ($I_{REM}$), for specular reflection of primary light ($I_{FRE}$) and for diffuse emission of secondary light ($I_{EM}$) with an altered wavelength compared to the primary light.

The light conversion unit especially has a specific diffuse reflectance $SDR=t^{-1}\cdot I_{REM}/(I_0-I_{FRE})$ chosen such that the luminous flux emitted by the light conversion unit at the irradiance limit of the light conversion unit with regard to a variation in the proportion of the at least one optically active element from the group of lanthanoids is at most 4 $mm^{-1}$ away from a maximum, optionally at most 3.5 $mm^{-1}$, optionally at most 3 $mm^{-1}$.

The present invention further relates to the use of a lighting device or of a light conversion unit as described above, wherein the light conversion unit is operated at a margin from the irradiance limit of the light conversion unit of less than 50 percent, optionally less than 30 percent, optionally less than 10 percent.

In the case of this use, the light conversion unit may also be operated at a margin from the irradiance limit of the light conversion unit of greater than 5 percent, optionally greater than 10 percent, optionally greater than 15 percent.

As described above, specific diffuse reflectance SDR is an experimentally determinable parameter of a light conversion unit.

A method of determining the specific diffuse reflectance SDR of a light conversion unit including a light conversion element and optionally a substrate and optionally a binder especially, includes the following method steps: (a) irradiating the front side of the light conversion element with primary light ($I_0$), wherein the chosen irradiance of the primary light is especially sufficiently small that, in the case of a variation of the irradiance, the luminous flux emitted by the light conversion unit increases in a strictly linear manner with irradiance, (b) measuring the diffuse reflectance of primary light ($I_{REM}$) and the specular reflection of primary light ($I_{FRE}$), (c) measuring or determining the thickness t of the light conversion element, (d) calculating specific diffuse reflectance by the formula $SDR=t^{-1}\cdot I_{REM}/(I_0-I_{FRE})$.

BRIEF DESCRIPTION OF THE DRAWINGS

The invention is described in more detail hereinafter with reference to the figures that follow. The figures show: The above-mentioned and other features and advantages of this invention, and the manner of attaining them, will become more apparent and the invention will be better understood by reference to the following description of embodiments of the invention taken in conjunction with the accompanying drawings, wherein:

FIGS. 1A, 1B, and 1C show schematic section diagrams of light conversion units;

FIGS. 8A, 8B, 8C, and 8D show schematic section diagrams of measurement devices for ascertaining the thickness t of the light conversion element;

Corresponding reference characters indicate corresponding parts throughout the several views. The exemplifications set out herein illustrate at least one embodiment of the invention, and such exemplifications are not to be construed as limiting the scope of the invention in any manner.

DETAILED DESCRIPTION OF THE INVENTION

Figure 2:
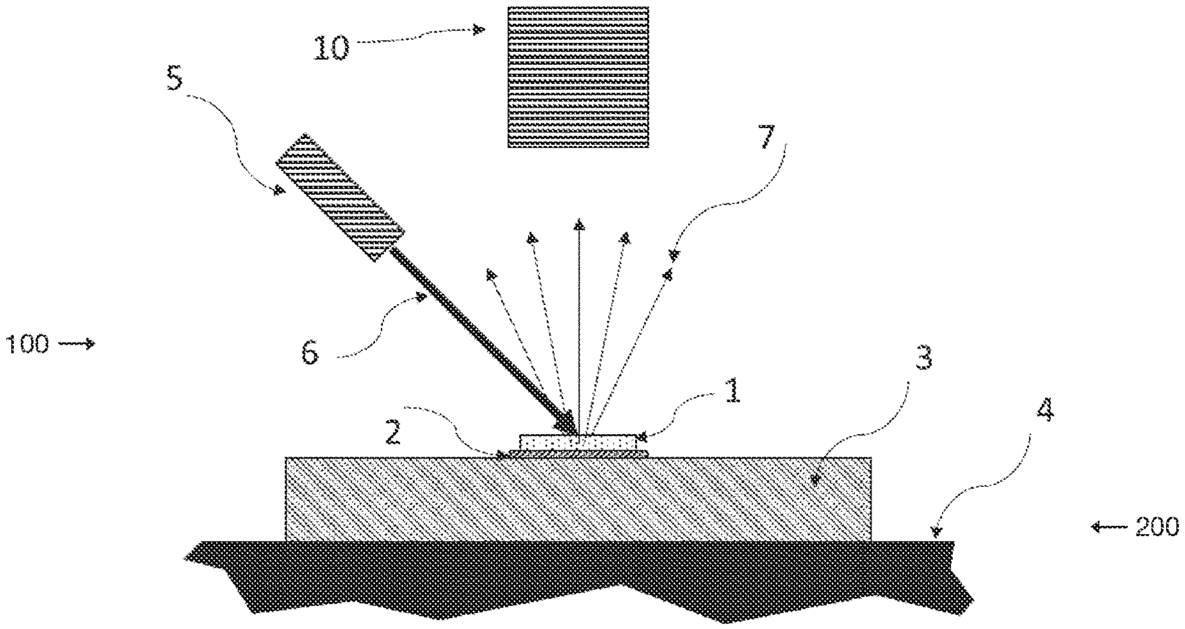
FIG. 2 shows a schematic section diagram of a measurement setup including an illumination device and a detector.

The characteristics of the converter material optimized for operation close to the irradiance limit were found by varying absorption, scatter, thermal conductivity and thickness for the case of YAG:Ce—, GYAG:Ce— and LuAG:Ce-based converter materials, firstly by way of controlled experiments (production and analysis of corresponding samples) and secondly by numerical simulations of the materials and their properties.

For the experimental determination of the irradiance limit, 4×4 $mm^2$ dies of a particular thickness, composed of various materials, polished on both sides, AR-coated on the front side, provided with a silver coating on the rear side, were bonded on the rear side to copper heat sinks by way of a silver sintering paste. Excitation was effected by way of a laser beam (450 nm) outcoupled from a fiber, of about 490 μm in diameter and having a virtually uniform beam profile ("top hat"). The radiation emitted was ascertained with increasing excitation power until the light output dropped.

FIGS. 1A, 1B, and 1C show light conversion units 200. The light conversion unit 200 shown in FIG. 1A and FIG. 1B includes a light conversion element 1, a substrate 3 and optionally a binder 2. The light conversion element 1 may especially take the form of a ceramic converter. The binder may take the form, for example, of a solder, adhesive, or sintered sinter paste. The substrate may take the form, for example, of a heat sink, for example including or composed of copper, or of a wheel including or composed of aluminium.

The light conversion unit 200 shown in FIG. 1C likewise includes a light conversion element 1, a substrate 3 and optionally a binder 2. The diagram is especially intended to illustrate that the light conversion element 1 on its front side may optionally have a coating, e.g. an "AR coating" 11. The light conversion element 1 may optionally also have, on its rear side, a coating 12, e.g. an "HR coating" and/or an "optical separation layer" and/or an adhesion promoter. Alternatively or additionally, a coating 13 may be provided, which constitutes a reflection layer of the light conversion element 1 and which has been applied, for example, on an adhesion promoter layer 12.

The substrate 3 may optionally also have, on its side facing the light conversion element 1 or the binder 2, a coating 31, for example including or composed of Au, NiP/Au and/or Ag.

FIG. 2 shows a test setup including a lighting device 100 and a detector 10. Unless stated otherwise, the elucidations given in connection with FIGS. 1A, 1B, 1C are applicable to the individual constituents and reference numerals. The lighting device 100 includes a light conversion unit 200, in this case with converter 1, binder 2 and substrate 3, wherein the substrate 3 has been applied to a top layer 4 that may have, for example, an adjustable temperature, a primary light source 5, for example a blue laser beam source, especially with beamforming, set up so as to emit a laser beam 6 that hits the front side of the converter 1 so as to give rise to emitted radiation 7 composed of diffusely reflected primary light and diffusely emitted secondary light.

The basic construction of the converter component in FIG. 1 is not limited to the above-described variant used for the measurements. Instead, this is one of many possible embodiments. This is correspondingly applicable to the basic measurement setup in FIG. 2.

A fundamental factor that should be mentioned is that the light conversion properties (the level of light output emitted or of the luminous flux emitted, the irradiance limit) depend essentially on the following properties of the converter material and further boundary conditions:

- Characteristics of the incident blue laser beam: wavelength, power, power density, beam profile.
- Characteristics of the converter material: coefficient of absorption and coefficient of scatter for the incident blue laser radiation and for the converted radiation of greater wavelength, quantum efficiency, Stokes shift, refractive index, thermal conductivity and thickness. These properties (except for thickness t) are more or less temperature-dependent.
- Characteristics of the converter surfaces or interfaces: reflectivity of the incidence and emission side (front side), reflectivity of the rear side, heat transfer on the rear side to an actively or passively cooled wheel ("dynamic" case) or to an actively or passively cooled heat sink ("static" case), and the surface quality of the converter ceramic (generally polished).

Numerical simulations were fundamentally conducted as described in V. Hagemann, A. Seidl, G. Weidmann: Static ceramic phosphor assemblies for high power high luminance SSL-light sources for digital projection and specialty lighting. Proc. of SPIE Vol. 11302 113021N-11, SPIE OPTO, San Francisco 2020, [1] hereinafter. Some simulations were firstly used to simulate the experimental measurements, and hence the simulation was intrinsically verified, and secondly, in order to extend the parameter space, further material properties that are not covered by the samples available were simulated.

The materials listed in Table 1 were available for the experimental study. These are materials from the range of YAG:Ce, GYAG:Ce and LuAG:Ce. x and y denote the respective proportions of Gd and of Ce at the Y and Lu positions in the crystal lattice. t is the thickness of the converter material. In the case of a mixed ceramic (composite), z denotes the proportion by volume of the added component (e.g. aluminium oxide). In this case, it is important in respect of the absorber properties that are proportional to the Ce content to replace the Ce content y with the "effective" Ce content $y_{eff}$, which is calculated as follows: $y_{eff}=(1-z)\cdot y$. In the case of "single-phase" converter materials (z=0), $y_{eff}$ is thus equal to y. If the scatter properties of the components of a mixed ceramic are distinctly different, an effective value is ascertained here too. The same may also apply to thermal conductivity and refractive index.

The laser beam power density attained at maximum measured light output is the irradiance limit. The accuracy of the determination depends on the degree to which the increase in laser power is stepped in the region of the irradiance limit. This applies both to experiment and to simulation.

Figure 3:
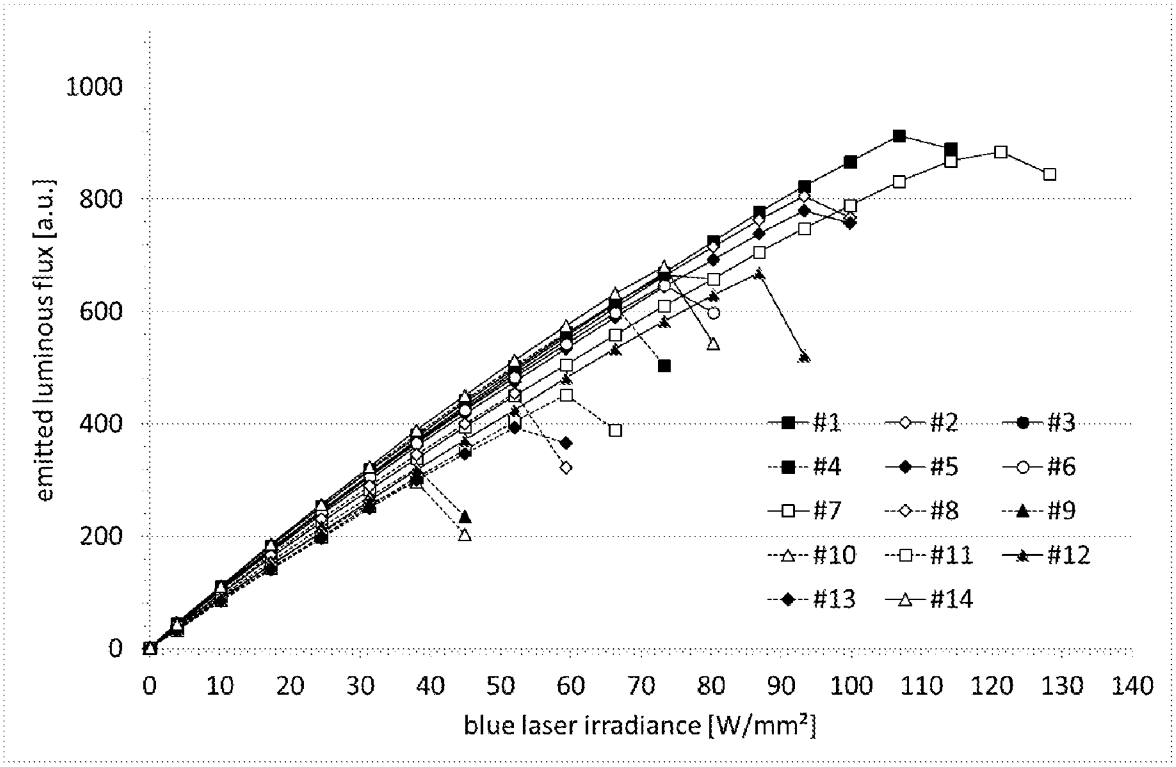
FIG. 3 shows graphs of emitted luminous flux against irradiance for 14 samples according to Table 1, the graphs being based on experimental measurements.

FIG. 3 shows, for the 14 samples from Table 1 below, the progression of emitted luminous flux with increasing laser power.

TABLE 1

Laser power density attained at maximum light output (irradiance limit) for different converter materials (experimental determination).

| No. | Material | x | y | z | $y_{eff}$ | s [$cm^{-1}$] | t [μm] | Irradiance limit [$W/mm^2$] |
|---|---|---|---|---|---|---|---|---|
| #1 | $(Lu_{1-y}\ Ce_y)_3\ Al_5\ O_{12}$ | — | 0.0036 | — | 0.0036 | ~350 | 80 | 107 |
| #2 | $(Lu_{1-y}\ Ce_y)_3\ Al_5\ O_{12}$ | — | 0.0036 | — | 0.0036 | ~350 | 90 | 93 |
| #3 | $(Lu_{1-y}\ Ce_y)_3\ Al_5\ O_{12}$ | — | 0.0063 | — | 0.0063 | ~350 | 80 | 73 |
| #4 | $(Lu_{1-y}\ Ce_y)_3\ Al_5\ O_{12}$ | — | 0.0063 | — | 0.0063 | ~350 | 100 | 66 |
| #5 | $[(Lu_{1-y}Ce_y)_3\ Al_5O_{12}]_{1-z}[Al_2O_3]_z$ | — | 0.0050 | 0.05 | 0.0048 | ~350 | 80 | 93 |
| #6 | $[(Lu_{1-y}Ce_y)_3\ Al_5O_{12}]_{1-z}[Al_2O_3]_z$ | — | 0.0050 | 0.05 | 0.0048 | ~350 | 100 | 73 |
| #7 | $[(Lu_{1-y}Ce_y)_3\ Al_5O_{12}]_{1-z}[Al_2O_3]_z$ | — | 0.0063 | 0.5 | 0.0032 | ~350 | 100 | 121 |
| #8 | $(Y_{1-y}\ Ce_y)_3\ Al_5\ O_{12}$ | — | 0.0030 | — | 0.0030 | ~500 | 150 | 52 |
| #9 | $(Y_{1-x-y}\ Gd_x\ Ce_y)_3\ Al_5\ O_{12}$ | 0.055 | 0.0027 | — | 0.0027 | ~550 | 150 | 38 |
| #10 | $(Y_{1-x-y}\ Gd_x\ Ce_y)_3\ Al_5\ O_{12}$ | 0.1 | 0.0024 | — | 0.0024 | ~600 | 150 | 38 |
| #11 | $(Y_{1-x-y}\ Gd_x\ Ce_y)_3\ Al_5\ O_{12}$ | 0.05 | 0.0012 | — | 0.0012 | ~450 | 150 | 59 |
| #12 | $(Y_{1-y}\ Ce_y)_3\ Al_5\ O_{12}$ | — | 0.0012 | — | 0.0012 | ~400 | 150 | 87 |
| #13 | $(Y_{1-x-y}\ Gd_x\ Ce_y)_3\ Al_5\ O_{12}$ | 0.1 | 0.0012 | — | 0.0012 | ~500 | 150 | 52 |
| #14 | $(Lu_{1-y}\ Ce_y)_3\ Al_5\ O_{12}$ | — | 0.0050 | — | 0.0050 | ~350 | 100 | 73 |

In order to verify the numerical simulation, the experimental data of samples #2, #4, #7 and #14 were used. For this purpose, the material parameters reported in [1] (for YAG:Ce) were replaced by those for LuAG:Ce. In the case of #7, in addition, elevated thermal conductivity owing to the presence of a mixed LuAG-Al2O3 ceramic was taken into account, and the absorption is a result of the effective Ce content $y_{eff}$.

Figure 4:
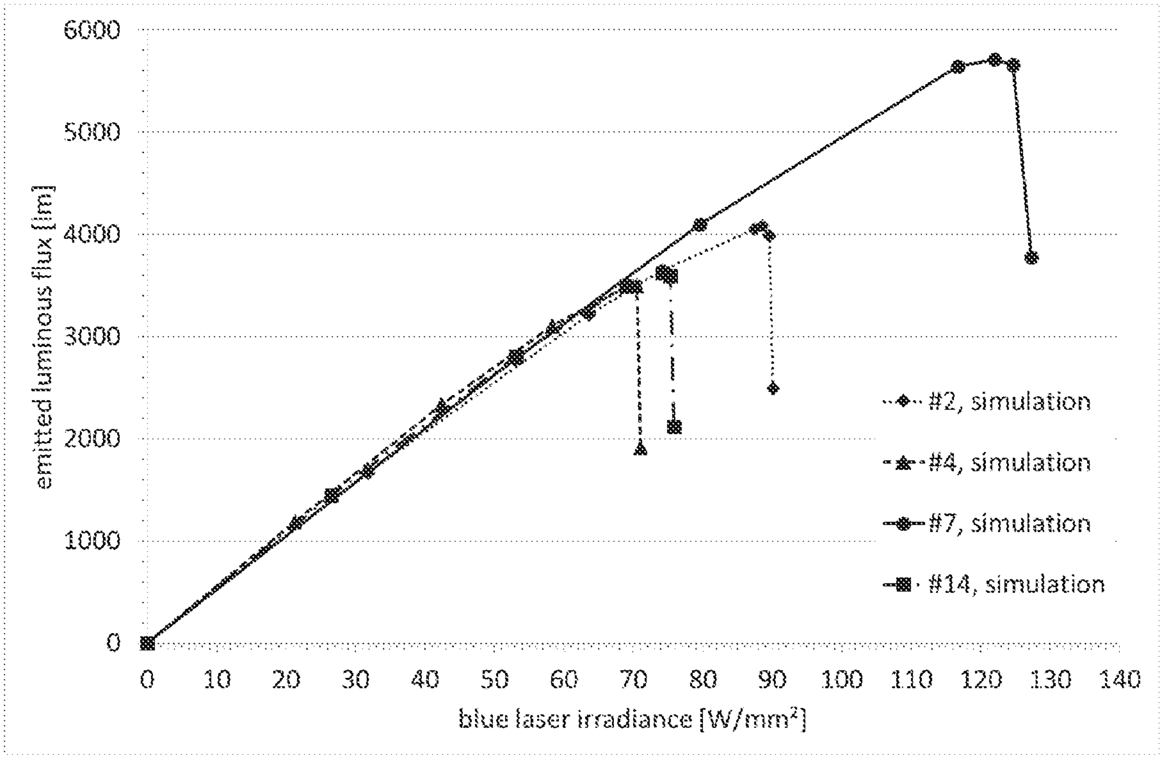
FIG. 4 shows graphs of emitted luminous flux against irradiance for 4 samples according to Table 2, the graphs being based on numerical simulations.

FIG. 4 shows, as a result, the simulation data for the emitted luminous flux with increasing irradiance for the four samples mentioned.

Figure 5:
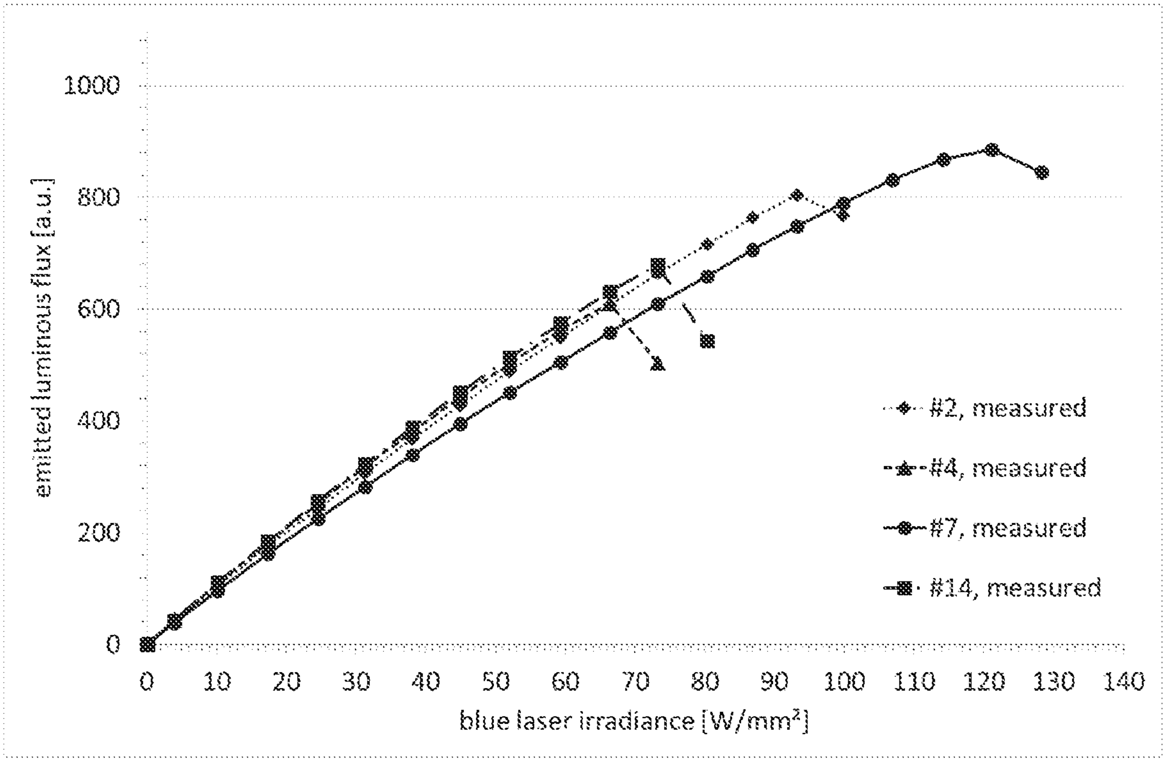
FIG. 5 shows graphs of emitted luminous flux against irradiance for 4 samples according to Table 2, the graphs being based on experimental measurements.

By way of comparison, FIG. 5 shows the experimentally determined progressions, i.e. in each case the emitted luminous flux measured with increasing irradiance for the four different samples. The progressions and especially the limit are in good agreement with the experimental results, as also shown in Table 2 below.

TABLE 2

Irradiance limit for different converter materials (comparison of experimental determination and numerical simulation).

| No. | Material | y | z | $y_{eff}$ | Thickness [μm] | Irradiance limit measured [$W/mm^2$] | Irradiance limit simulation [$W/mm^2$] |
|---|---|---|---|---|---|---|---|
| #2 | $(Lu_{1-y}\ Ce_y)_3\ Al_5\ O_{12}$ | 0.0036 | — | 0.0036 | 90 | 93 | 88 |
| #4 | $(Lu_{1-y}\ Ce_y)_3\ Al_5\ O_{12}$ | 0.0063 | — | 0.0063 | 100 | 66 | 69 |

TABLE 2-continued

Irradiance limit for different converter materials (comparison of experimental determination and numerical simulation).

| No. | Material | y | z | $y_{eff}$ | Thickness [μm] | Irradiance limit measured [W/mm²] | Irradiance limit simulation [W/mm²] |
|---|---|---|---|---|---|---|---|
| #7 | $[(Lu_{1-y}Ce_y)_3\ Al_5O_{12}]_{1-z}[Al_2O_3]_z$ | 0.0063 | 0.5 | 0.0032 | 100 | 121 | 122 |
| #14 | $(Lu_{1-y}\ Ce_y)_3\ Al_5\ O_{12}$ | 0.0050 | — | 0.0050 | 100 | 73 | 74 |

Figure 6A:
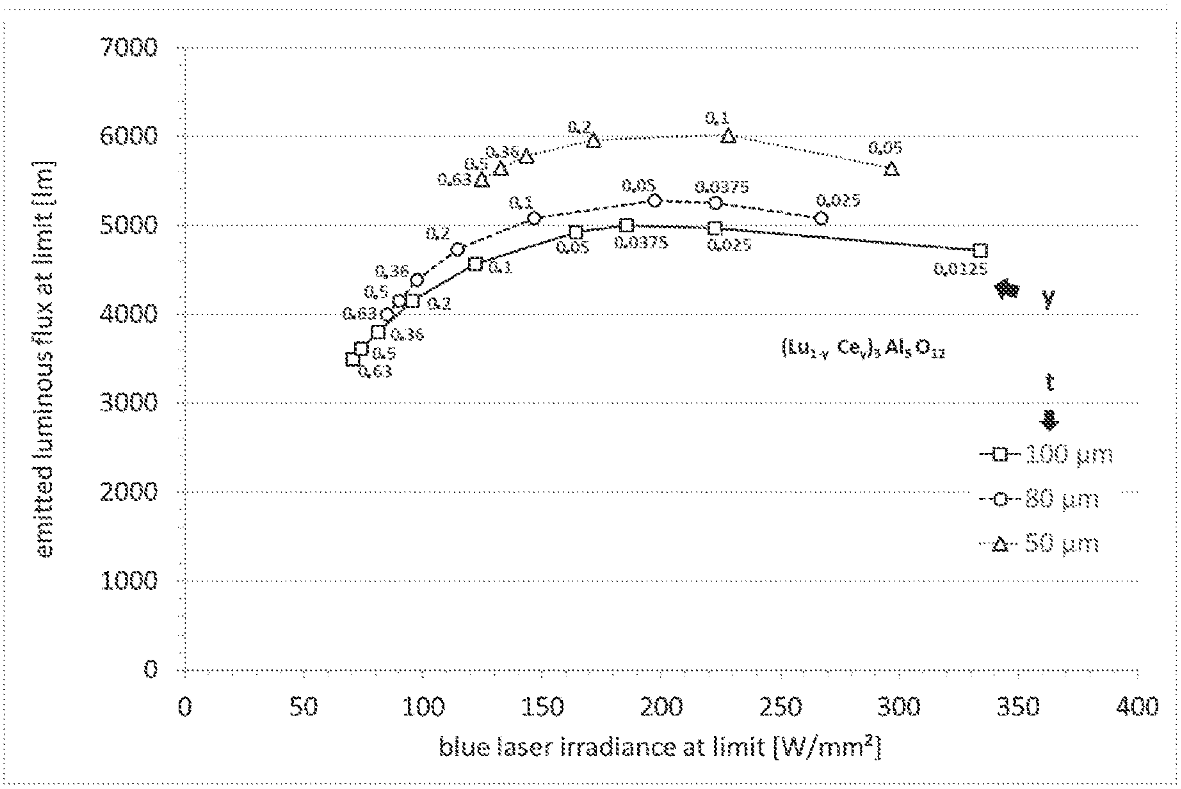
FIGS. 6A, 6B, 6C, 6D, and 6E show graphs of emitted luminous flux at the irradiance limit for various Ce contents of the light conversion element, plotted against irradiance at the irradiance limit.

FIG. 6A shows the emitted luminous flux calculated in each case at the irradiance limit, for LuAG:Ce with coefficient of scatter s=350 $cm^{-1}$, at different thickness t, for various Ce contents y, here in at %. What is thus shown is the maximum luminous flux ascertained by simulation (luminous flux of the converted emitted light at the irradiance limit, i.e. the maximum of calculated progressions of the type as shown in FIG. 4) depending on the Ce content y, for 3 different thicknesses of the converter, by way of example for LuAG:Ce with an illustrative coefficient of scatter of 350 $cm^{-1}$. It can be seen that, within the range examined, thinner converters lead to higher possible luminous fluxes, and also that there is an optimal range in each case for the Ce content (range of highest possible luminous flux).

Figure 6B:
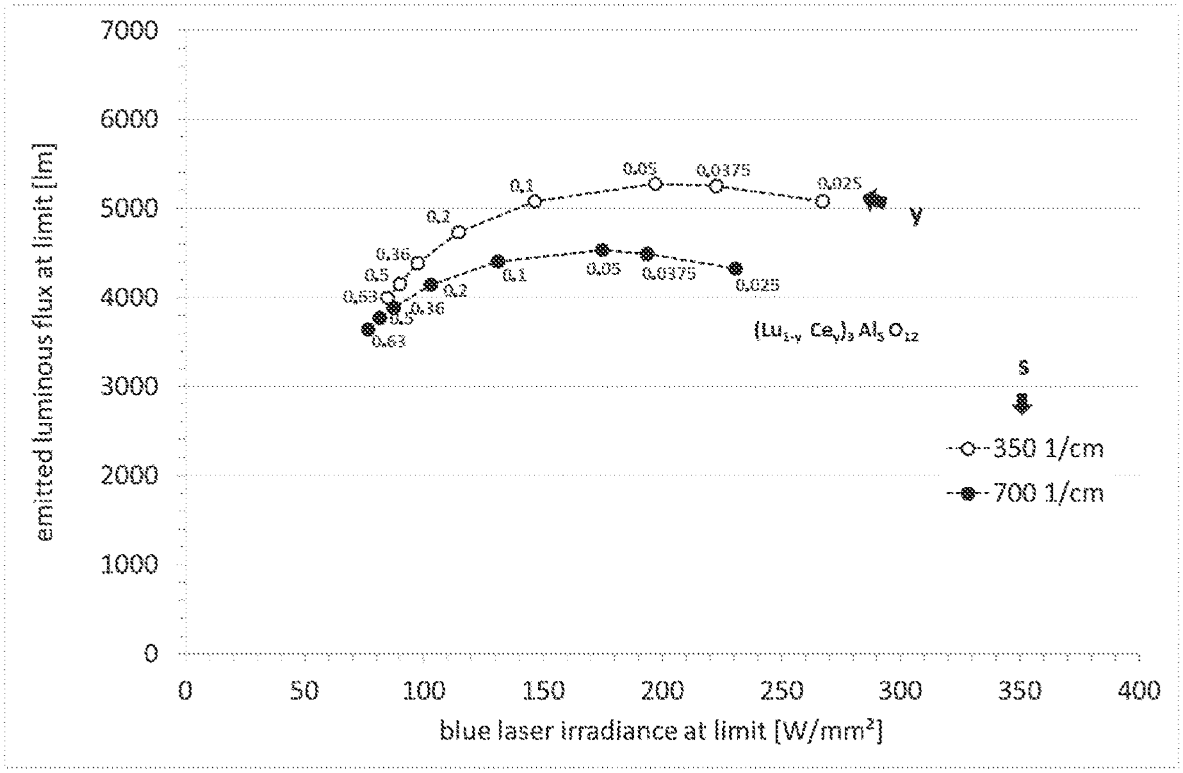

FIG. 6B shows the corresponding comparison for an illustrative variation in the coefficient of scatter, i.e. the emitted luminous flux calculated in each case at the irradiance limit, for LuAG:Ce with thickness t=80 μm at a different coefficient of scatter s for various Ce contents y, here in at %.

A similar effect to a reduction in converter thickness is possessed by the illustrative addition of aluminium oxide to YAG:Ce or to LuAG:Ce. Since aluminium oxide has about 3 times the thermal conductivity of YAG or LuAG, this increases the thermal conductivity of the converter material overall (in accordance with the proportion by volume of $Al_2O_3$). Alternatively, it would also be possible to add a different component having comparatively high thermal conductivity with low absorption in the region of the converted light, e.g. aluminium nitride.

Figure 6C:
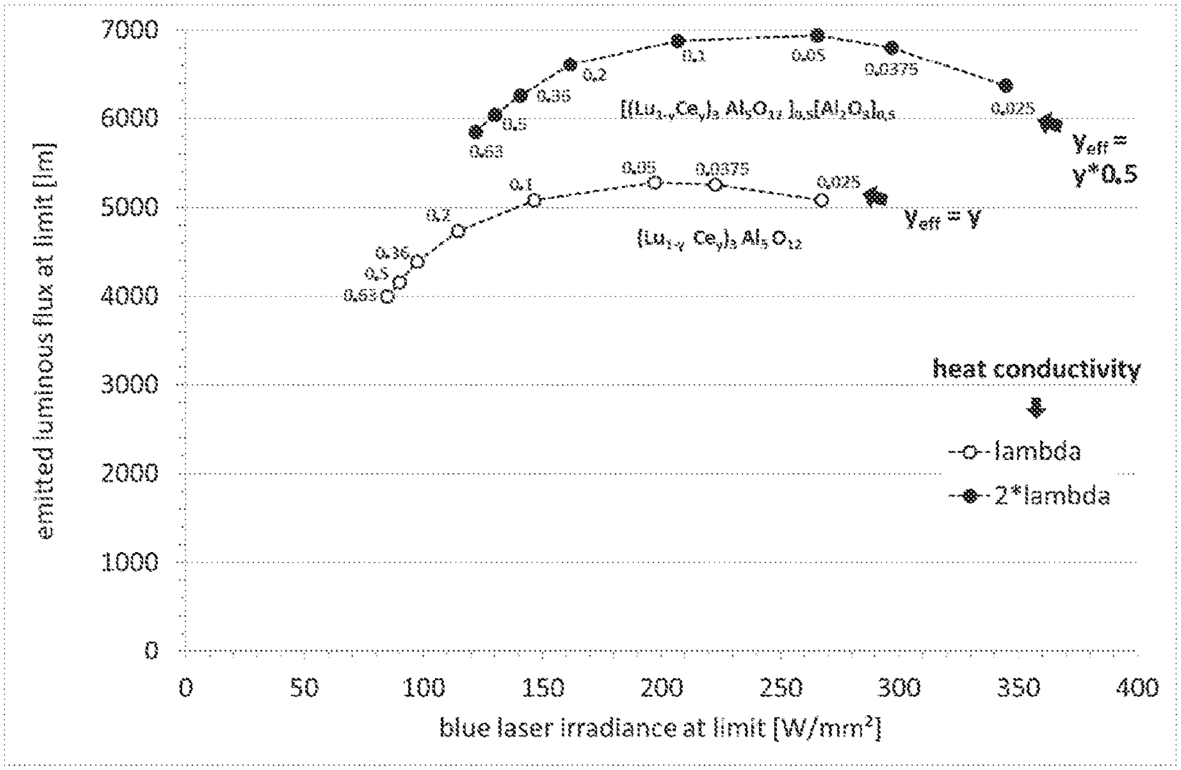

FIG. 6C shows the emitted luminous flux calculated in each case at the irradiance limit, for LuAG:Ce by comparison with a mixed LuAG-$Al_2O_3$ ceramic, for thickness t=80 μm, coefficient of scatter s=350 $cm^{-1}$, for various (effective) Ce contents $y_{eff}$, here in at %. This shows the effect using the example of LuAG:Ce—$Al_2O_3$ at an illustrative converter thickness of 80 μm in the case of illustrative addition of aluminium oxide in such a way that thermal conductivity is increased in comparison by a factor of 2. An illustrative coefficient of scatter here too (for both components) is 350 $cm^{-1}$.

Figure 6D:
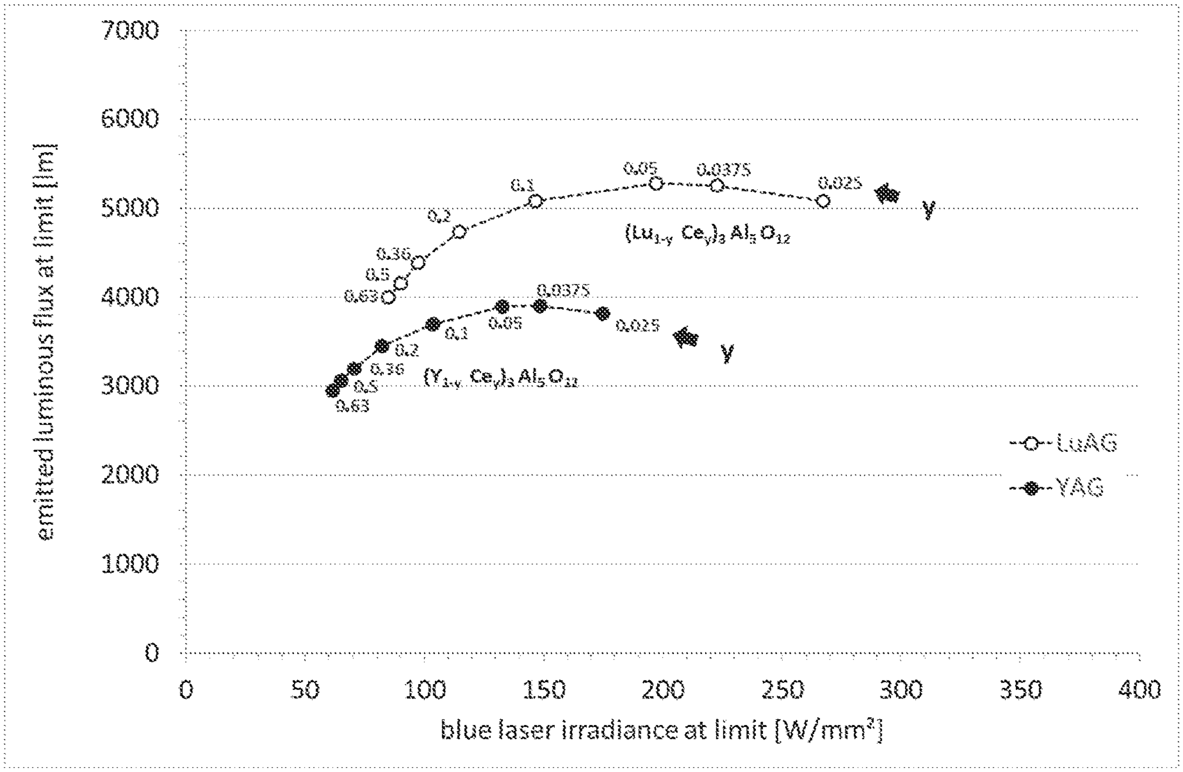

In FIG. 6D, LuAG:Ce is compared with YAG:Ce; what is shown in each case is the emitted luminous flux calculated at the irradiance limit, for LuAG:Ce by comparison with YAG:Ce, for thickness t=80 μm, coefficient of scatter s=350 $cm^{-1}$, for various Ce contents y, here in at %.

The reflectivity R of a rear-side reflective coating (for the wavelength range of the converted light) also affects the possible luminous flux, since more or less is absorbed at the rear side.

Figure 6E:
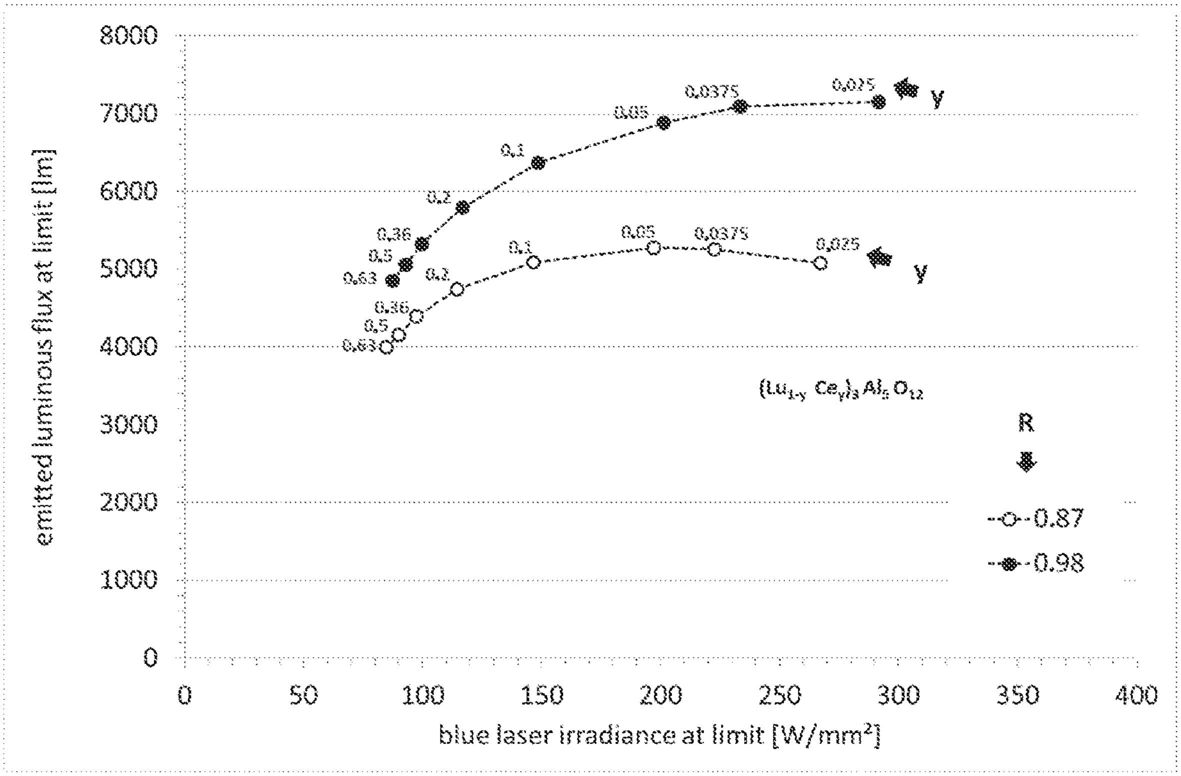

In FIG. 6E, by way of example, this reflectivity is varied, and hence shows the emitted luminous flux calculated at the irradiance limit, for LuAG:Ce with thickness t=80 μm, coefficient of scatter s=350 $cm^{-1}$, at different rear-side reflectivity R, for various Ce contents y, here in at %.

However, experimental determination of the irradiance limit is complex and harbors the risk of destruction as a result of overheating at the irradiation point.

By contrast, specific diffuse blue reflectance at low power (low power specific diffuse blue remission, low power SDBR, unit: $mm^{-1}$) can be ascertained via a non-destructive measurement on a finished component.

For the determination of low power SDBR, the converter material is irradiated with a (blue) laser beam of such low power or power density (irradiance) that it is not associated with any significant heating of the component, for example at about 1 $mW/mm^2$ ($10^{-3}$ $W/mm^2$). In the case of such low irradiance, there is a strictly linear increase in the emitted luminous flux of the converted radiation with increasing irradiance, meaning that efficiency/efficacy (luminous flux based on laser power) is independent of irradiance. Low power in the meaning intended here thus means "a linear increase in luminous flux emitted with incident irradiance". But it is never the case that all the incident blue light is absorbed. A portion of the (blue) laser light is subject to direct specular reflection at the surface (Fresnel reflection). A portion of the proportion that penetrates is absorbed (and a portion of that in turn is converted), but another portion is diffusely backscattered again (reflected) without being absorbed. This diffusely backscattered, unabsorbed component of the penetrating (non-Fresnel-reflected) (blue) laser radiation is the "diffuse (blue) reflectance" DBR, and the SDBR is that value based on the thickness of the converter t:

$$SDBR=DBR/t$$

Figure 7:
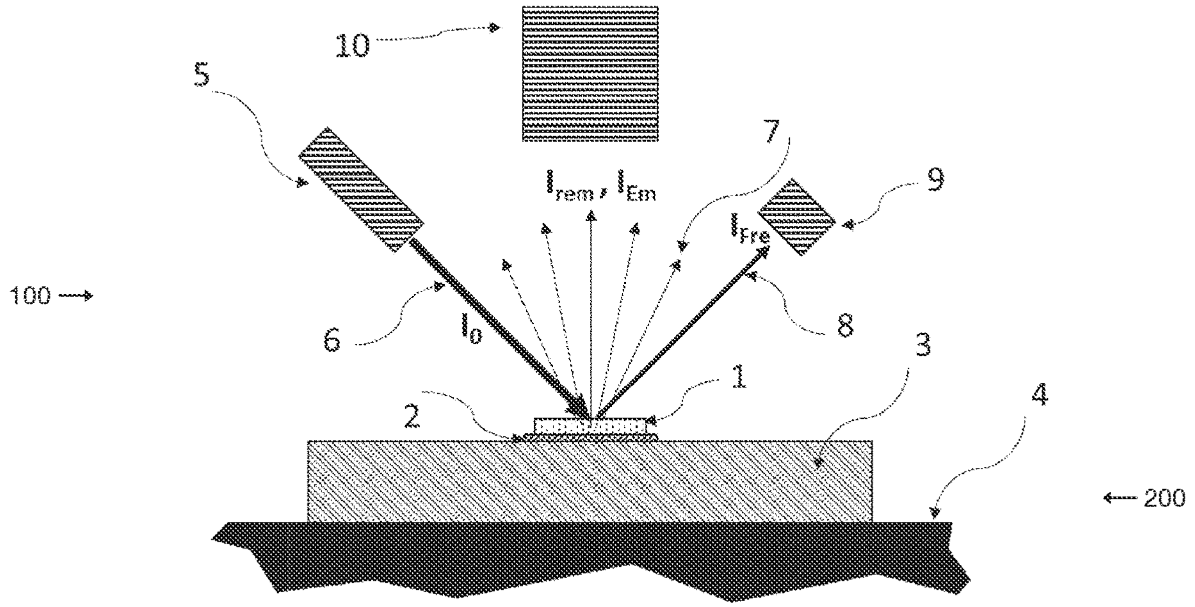
FIG. 7 shows a schematic section diagram of a test setup including an illumination device and detectors.

FIG. 7 shows the measurement principle for the determination of diffuse (blue) reflectance DBR. Unless stated otherwise, the elucidations given in association with FIGS. 1A, 1B, 1C and FIG. 2 are applicable to the individual constituents and reference numerals. Primary light with irradiance $I_0$ hits the front side of the light conversion element 1. This results in diffuse reflectance of primary light ($I_{REM}$), specular reflection of primary light ($I_{FRE}$) and diffuse emission of secondary light ($I_{EM}$) with an altered wavelength compared to the primary light. These components are detected by detectors 9, 10, with detector 9 being designed for mirror-reflected radiation and detector 10 for diffusely reflected (blue) and diffusely emitted converted radiation.

FIGS. 8A, 8B, 8C, and 8D show measurement principles for ascertaining the thickness t of the converter, where 51 represents a mechanical measurement of thickness, for example with a slide rule, 52 a measurement of thickness using ultrasound sensors, 53 a measurement of thickness using NIR laser Doppler interferometry, and 54 a mechanical measurement of thickness with callipers (the approximate thickness of the binder is measured as well). Unless stated otherwise, the elucidations given in connection with FIGS. 1A, 1B, 1C, FIG. 2 are applicable to the individual constituents and reference numerals.

The thickness t of the converter bonded to a substrate is thus either determined before the coating and bonding of the converter and is thus known, or it can be determined on the finished component on one side in a non-destructive manner, for example by acoustic (ultrasound sensors) or optical (NIR laser Doppler interferometry) ways, if the diameter of the component is large enough. Rapid and simple measurement of the finished component is also possible with a "calliper" as a way of measuring the relative distance of the surface from the heat sink surface, but it is still necessary in this case to subtract a known, approximate value for the typical thickness of the binder (generally in the order of magnitude of 10 to 30 μm).

Figure 9A:
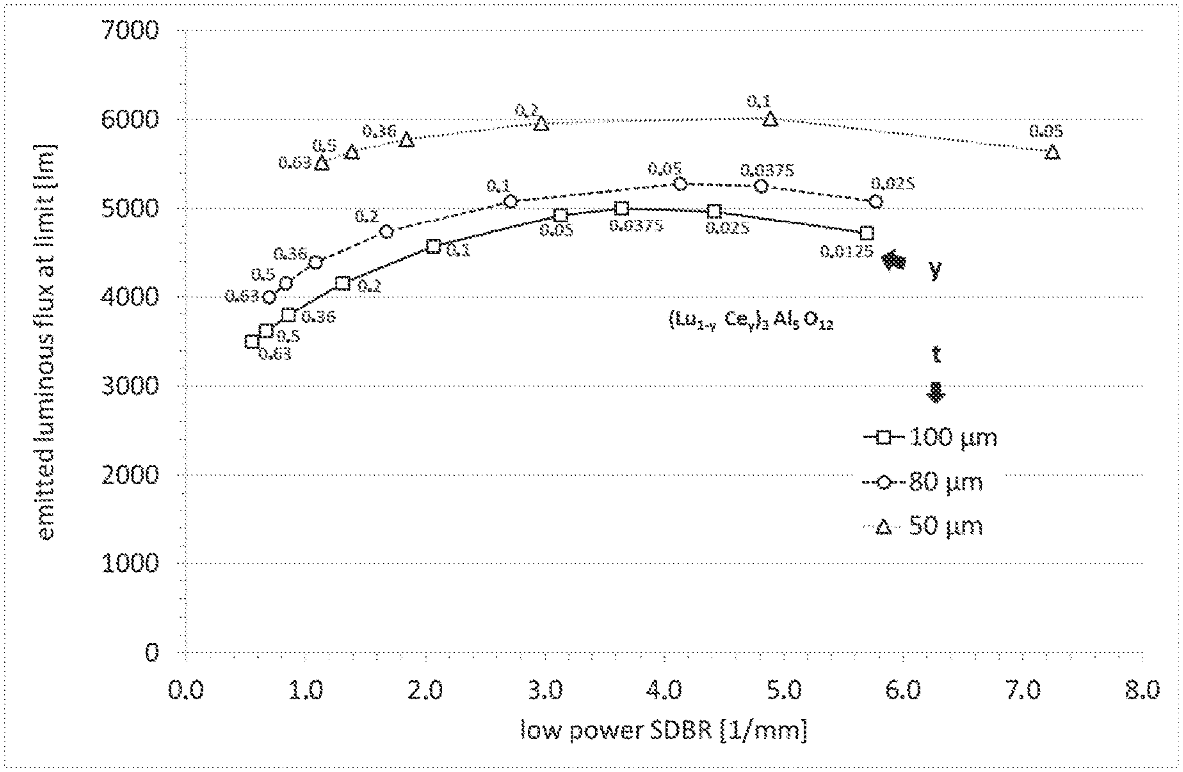
FIGS. 9A, 9B, 9C, 9D, and 9E show graphs of emitted luminous flux at the irradiance limit for various Ce contents of the light conversion element, plotted against specific diffuse reflectance.
Figure 9B:
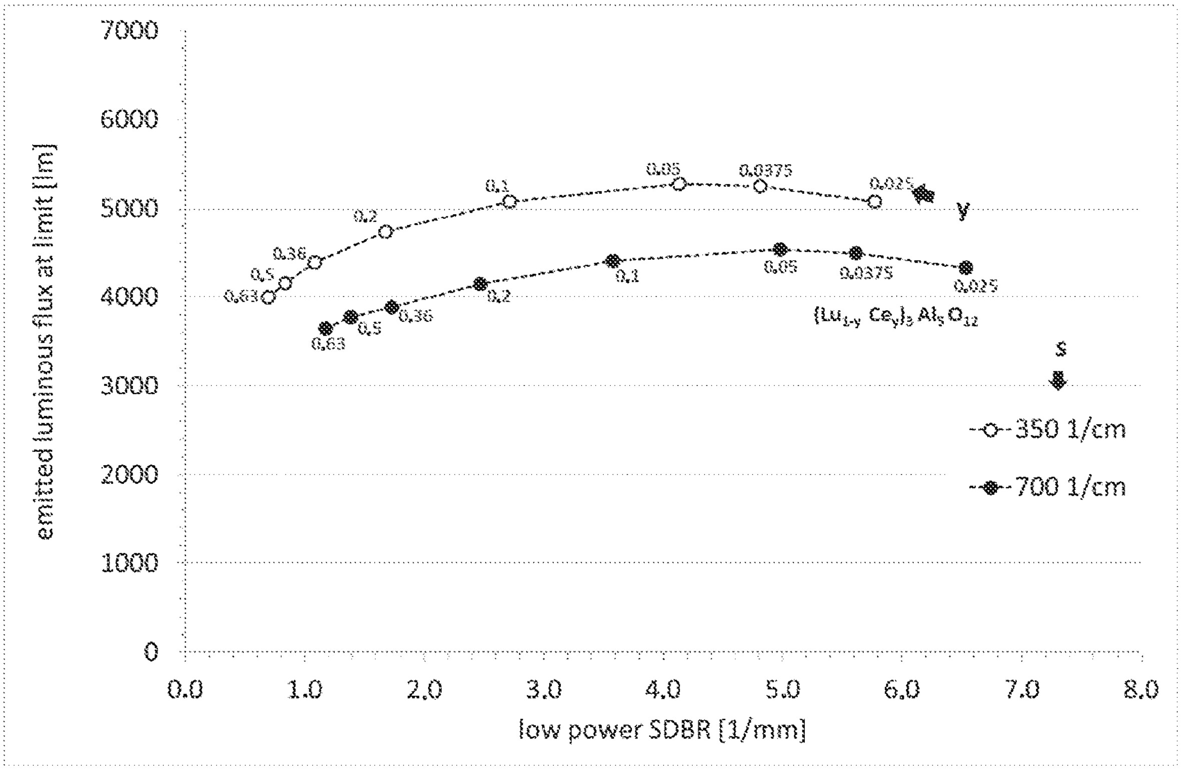
Figure 9C:
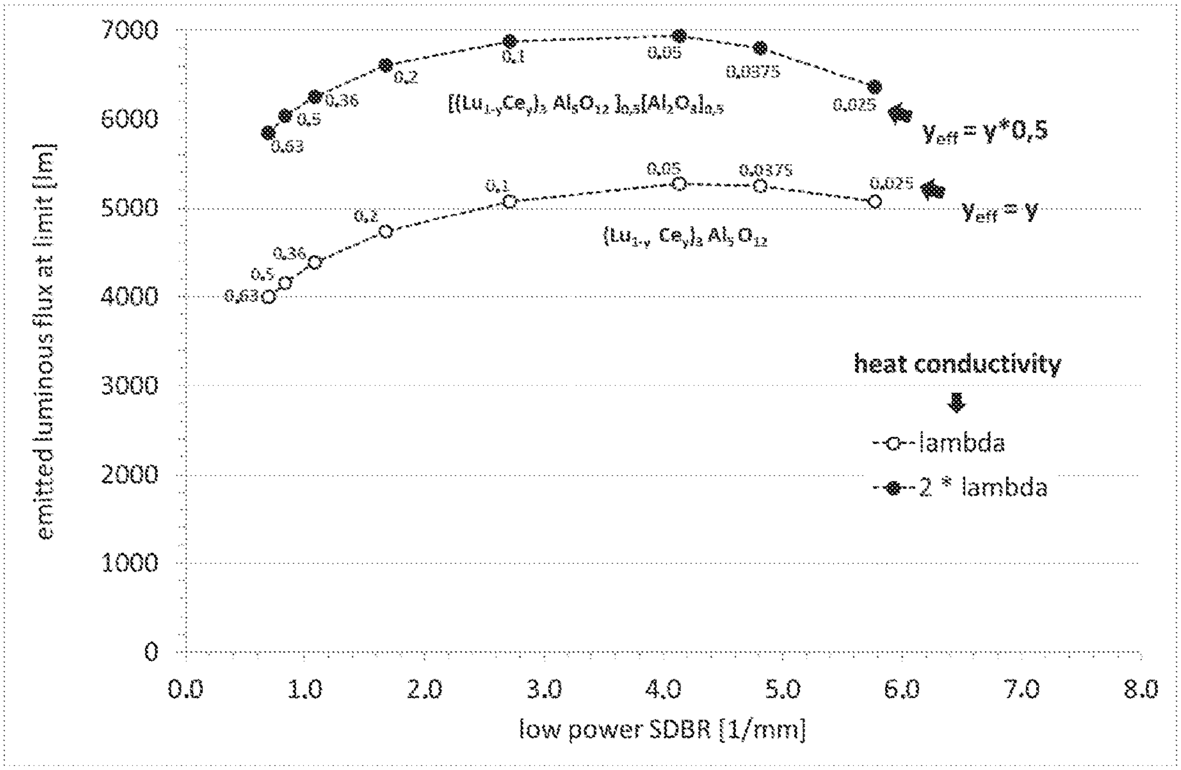
Figure 9D:
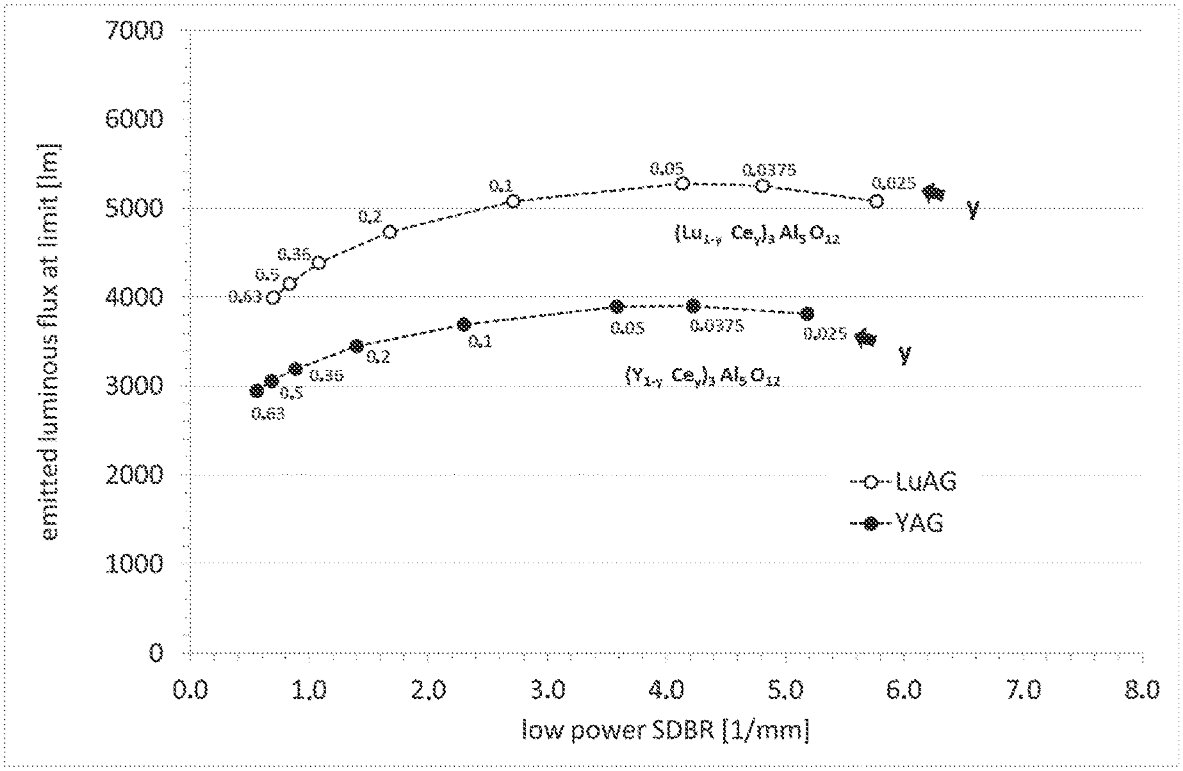
Figure 9E:
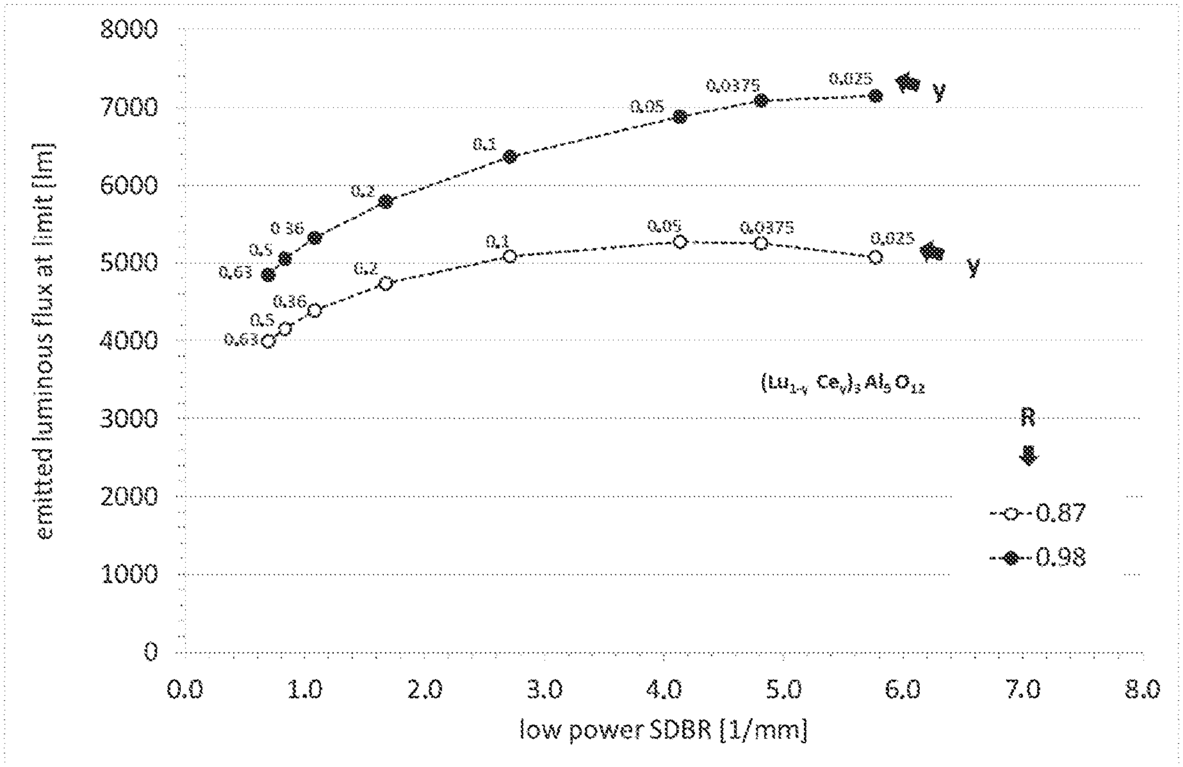

FIGS. 9A, 9B, 9C, 9D, and 9E correspond to FIGS. 6A, 6B, 6C, 6D, and 6E, except that the irradiance limit is plotted against the value of low power SDBR. FIG. 9A: emitted luminous flux calculated at the irradiance limit, for LuAG:Ce with coefficient of scatter s=350 $cm^{1}$, at different thickness t, for various Ce contents y, here in at %. FIG. 9B: emitted luminous flux calculated at the irradiance limit, for LuAG:Ce with thickness t=80 μm, with different coefficient of scatter s, for various Ce contents y, here in at %. FIG. 9C: emitted luminous flux calculated at the irradiance limit, for LuAG:Ce by comparison with a mixed LuAG-Al2O3 ceramic, for thickness t=80 μm, coefficient of scatter s=350 $cm^{-1}$, for various (effective) Ce contents $y_{eff}$, here in at %. FIG. 9D: emitted luminous flux calculated at the irradiance limit, for LuAG:Ce by comparison with YAG:Ce, for thickness t=80 μm, coefficient of scatter s=350 $cm^{-1}$, for various Ce contents y, here in at %. FIG. 9E: emitted luminous flux calculated at the irradiance limit, for LuAG:Ce with thickness t=80 μm, coefficient of scatter s=350 $cm^{-1}$, at different rear-side reflectivity R, for various Ce contents y, here in at %.

For maximization of possible luminous flux, an option is given especially to a low power SDBR between 3 and 6.

However, it should be remembered that efficiency or, better, efficacy (lm/W) is likewise significant in respect of performance. Efficacy at the irradiance limit is emitted luminous flux based on incident laser power.

Figure 10A:
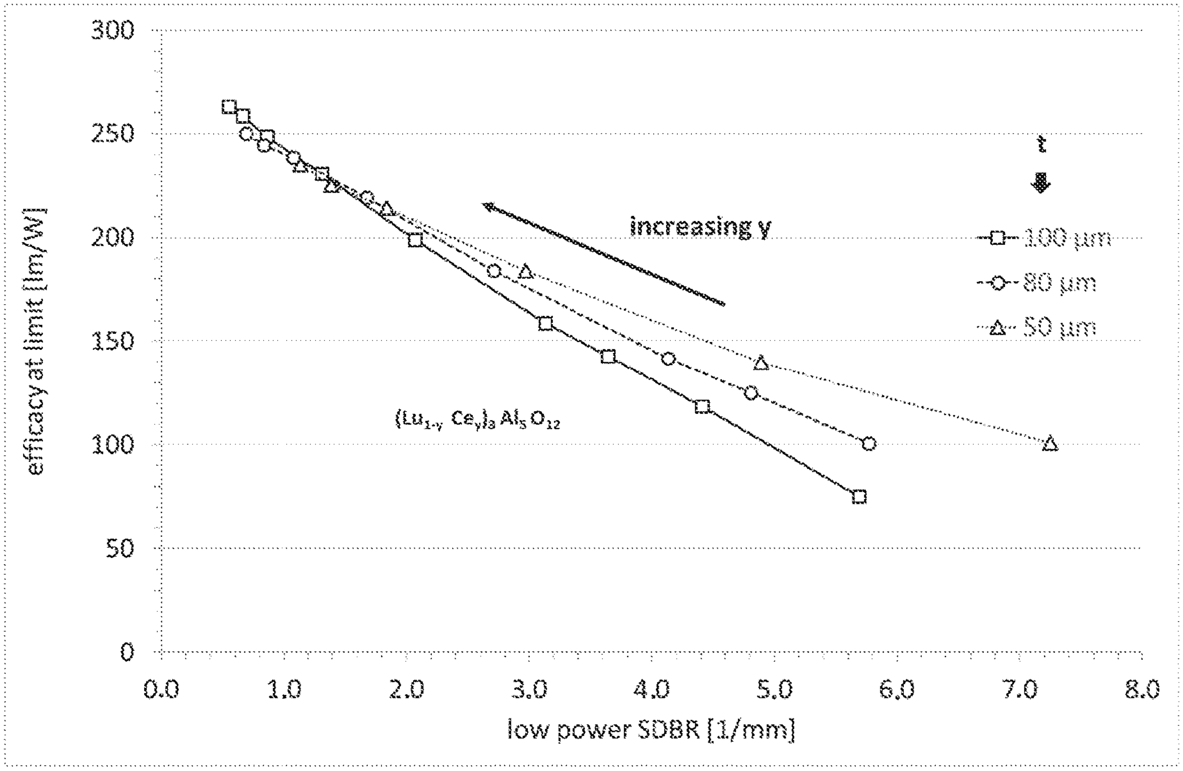
FIGS. 10A, 10B, 10C, 10C, 10D, and 10E show graphs of efficacy at the irradiance limit for the same variations as in FIGS. 9A, 9B, 9C, 9D, and 9E, plotted against specific diffuse reflectance.
Figure 10B:
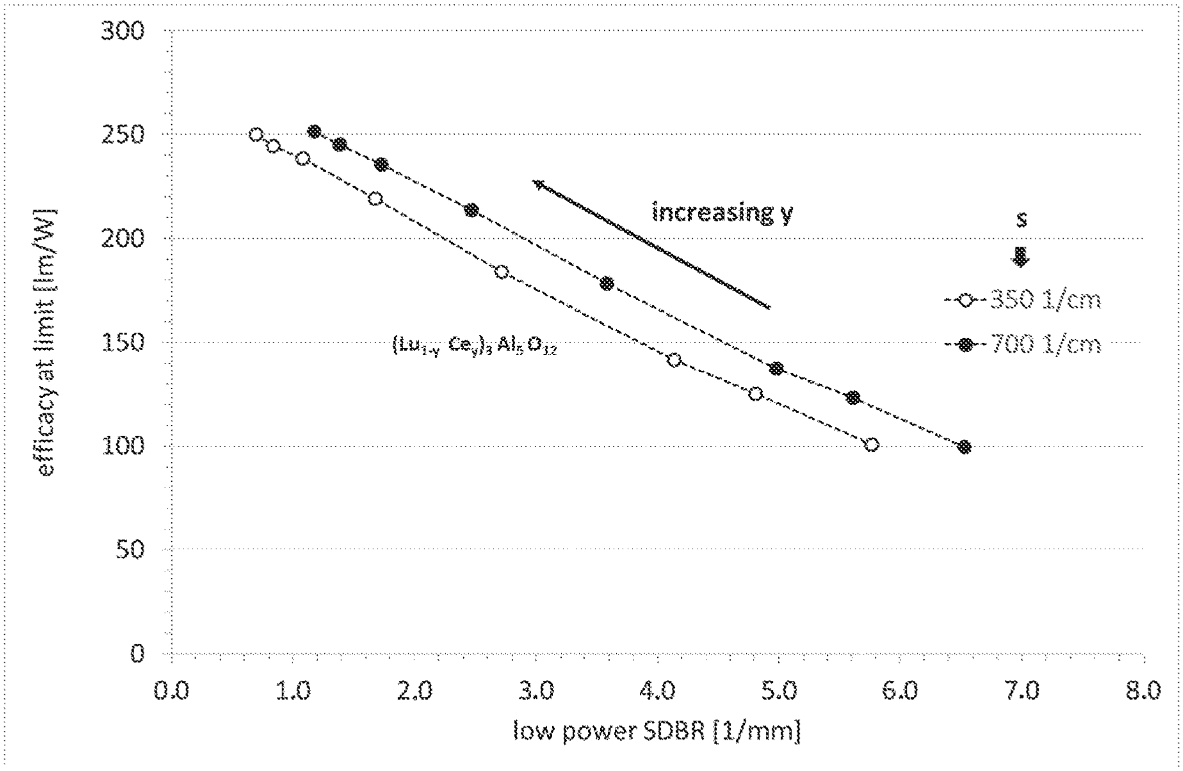
Figure 10C:
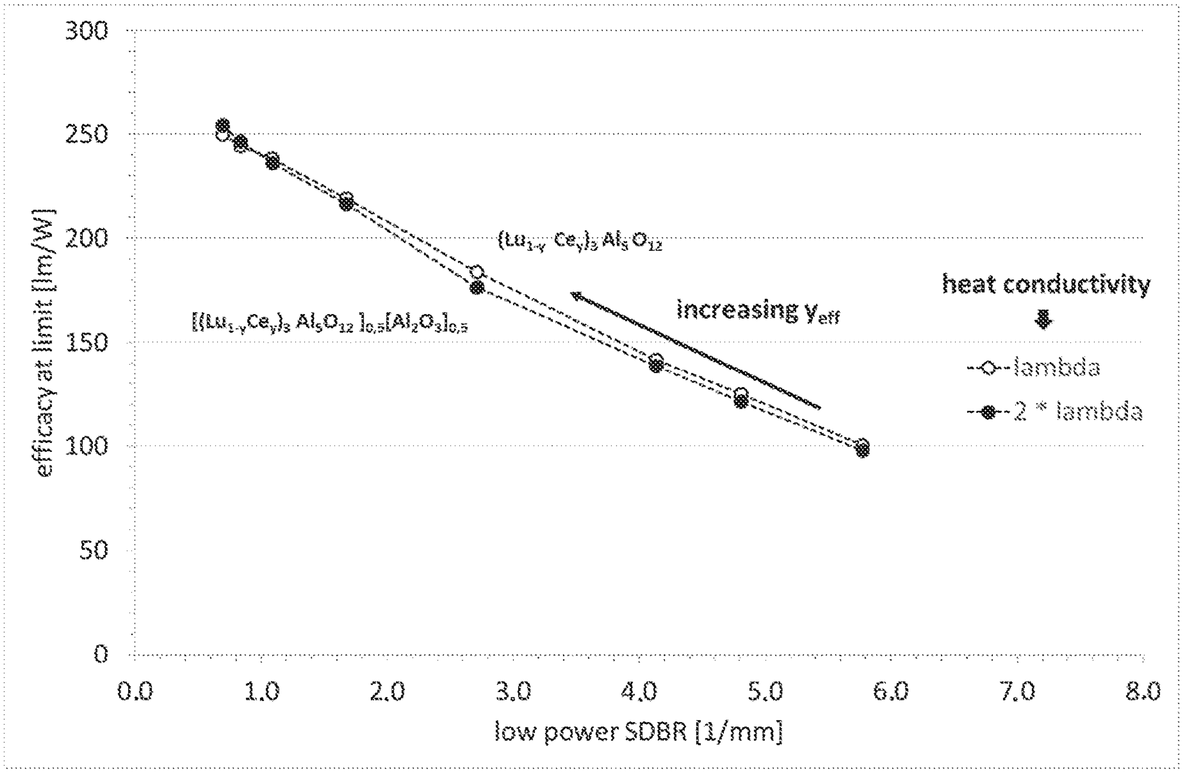
Figure 10D:
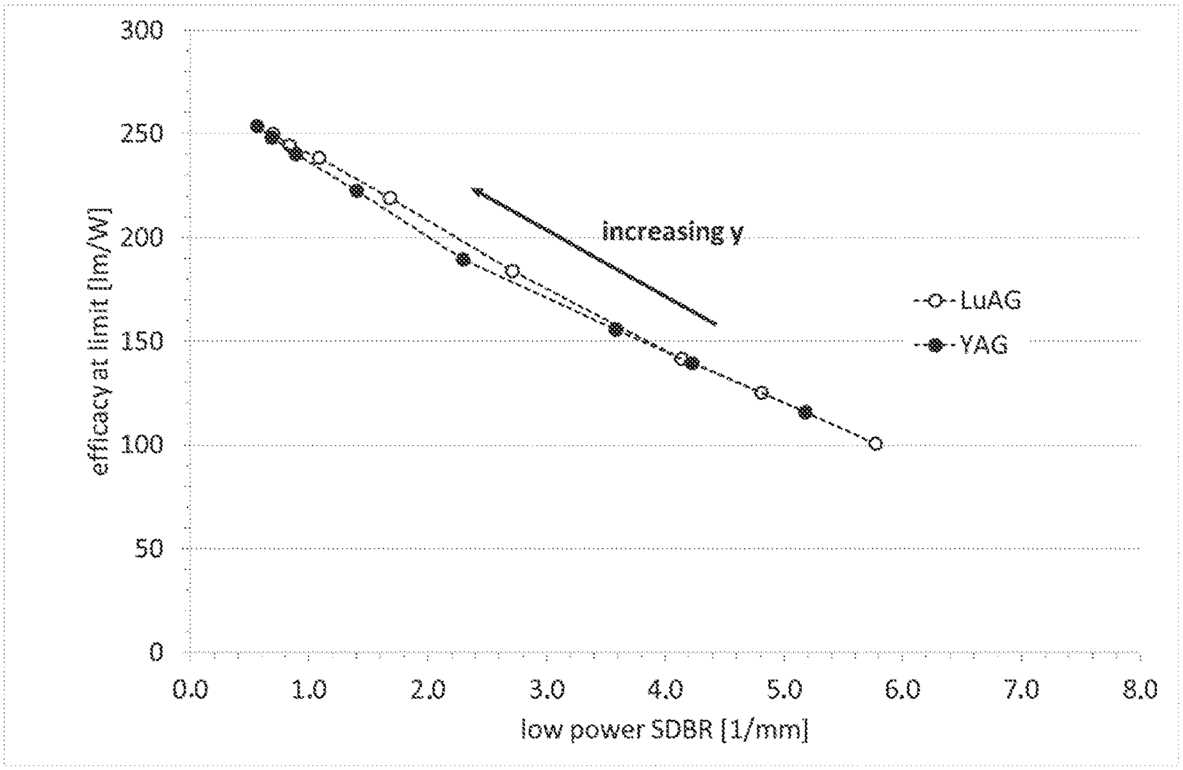
Figure 10E:
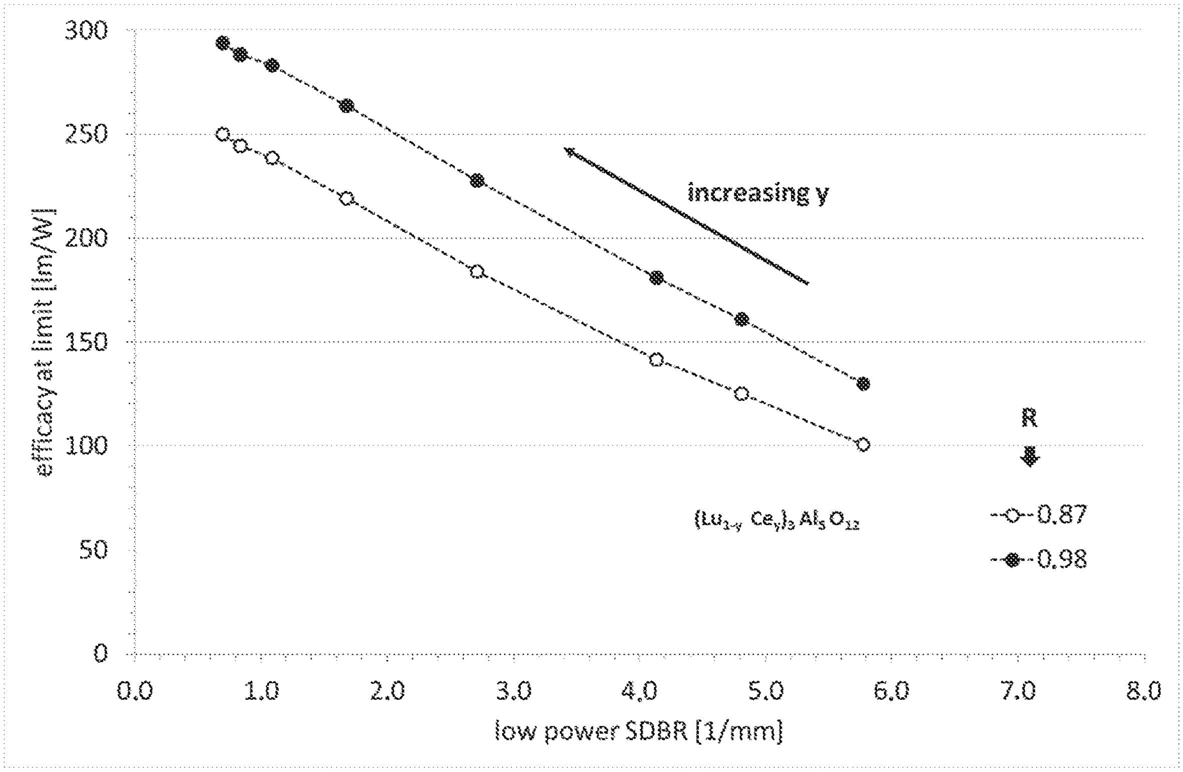

FIGS. 10A, 10B, 10C, 10D, and 10E show the dependence of efficacy on the irradiance limit for the same variations as in FIGS. 9A, 9B, 9C, 9D, and 9E. FIG. 10A: calculated efficacy at the irradiance limit, for LuAG:Ce with coefficient of scatter s=350 $cm^{-1}$, at different thickness t, for various Ce contents y. FIG. 10B: calculated efficacy at the irradiance limit, for LuAG:Ce with thickness t=80 μm, at different coefficient of scatter s, for various Ce contents y. FIG. 10C: calculated efficacy at the irradiance limit, for LuAG:Ce by comparison with a mixed LuAG-Al2O3 ceramic, for thickness t=80 μm, coefficient of scatter s=350 $cm^{-1}$, for various (effective) Ce contents $y_{eff}$. FIG. 10D: calculated efficacy at the irradiance limit, for LuAG:Ce by comparison with YAG:Ce, for thickness t=80 μm, coefficient of scatter s=350 $cm^{-1}$, for various Ce contents y. FIG. 10E: calculated efficacy at the irradiance limit, for LuAG:Ce with thickness t=80 μm, coefficient of scatter s=350 $cm^{-1}$, at different rear-side reflectivity R, for various Ce contents y.

Both may be significant for the performance of a converter component: maximum luminous flux F and maximal efficacy h. This is expressed by the product of the two parameters, efficient luminous flux:

$$ELF = F*h$$

Figure 11A:
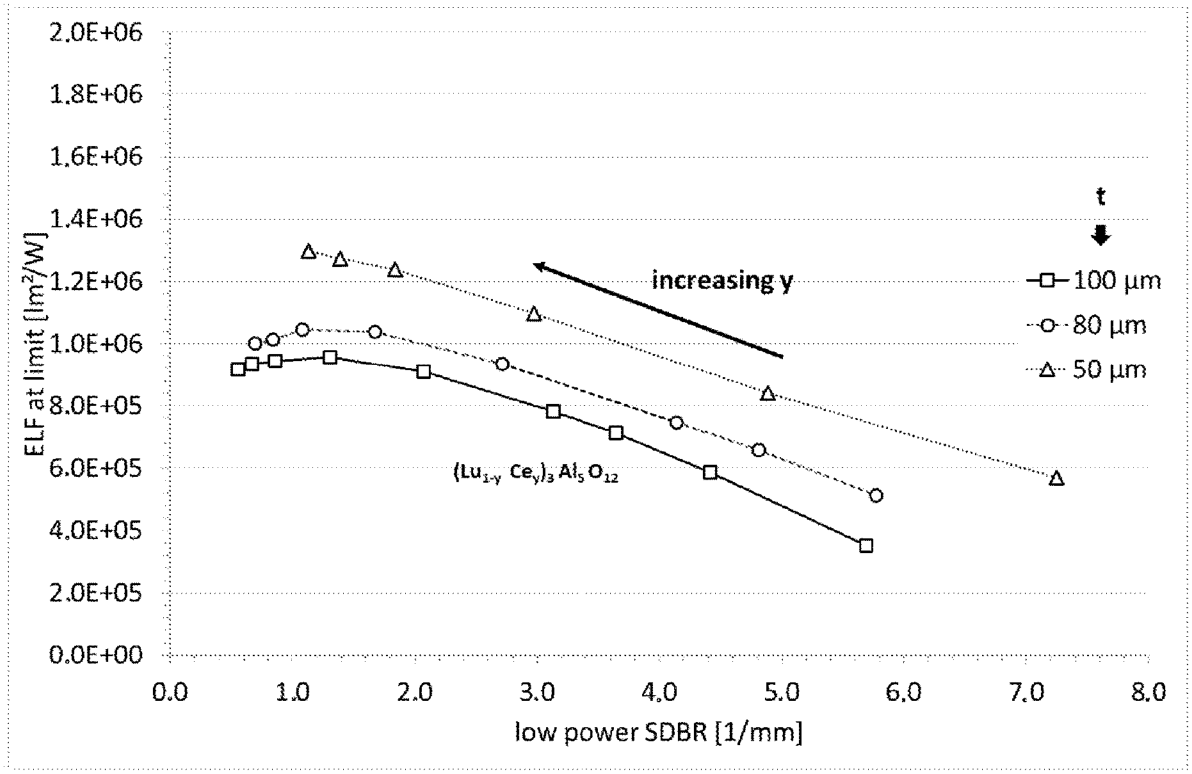
FIGS. 11A, 11B, 11C, 11D, and 11E shows graphs of efficient luminous flux (ELF) at the irradiance limit for the same variations as in FIGS. 9*a-e*, plotted against specific diffuse reflectance.
Figure 11B:
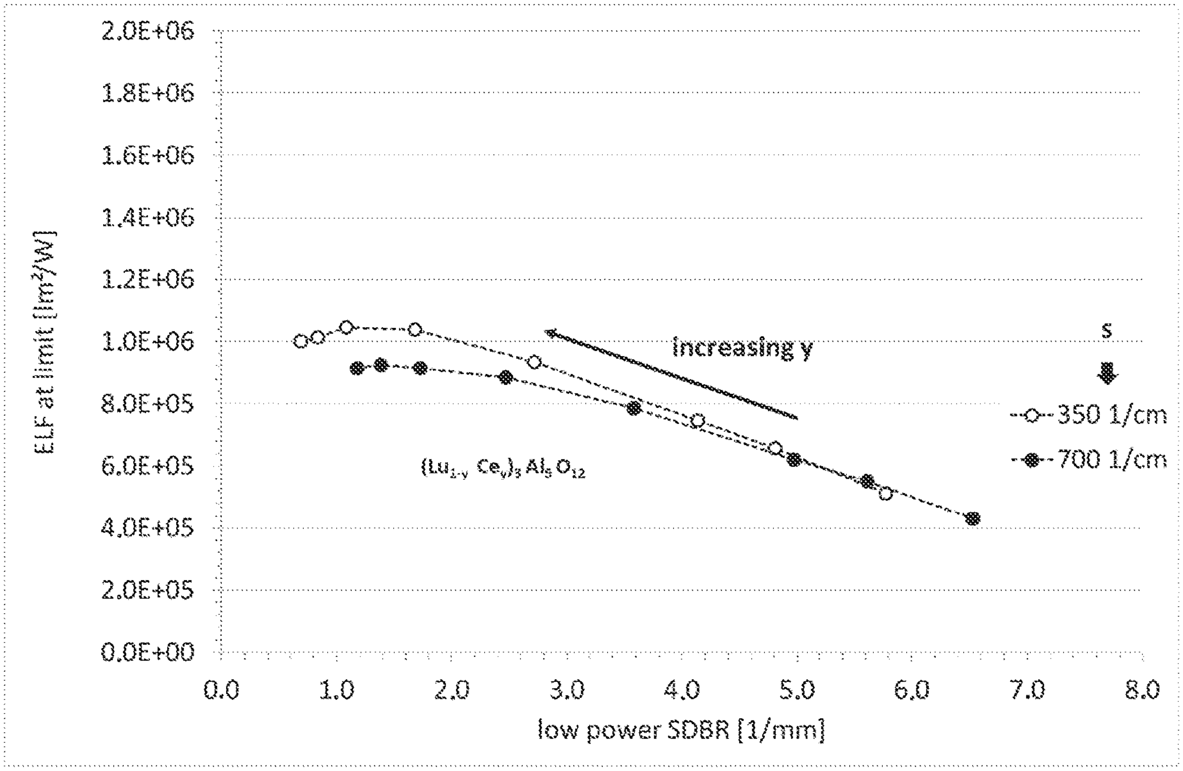
Figure 11C:
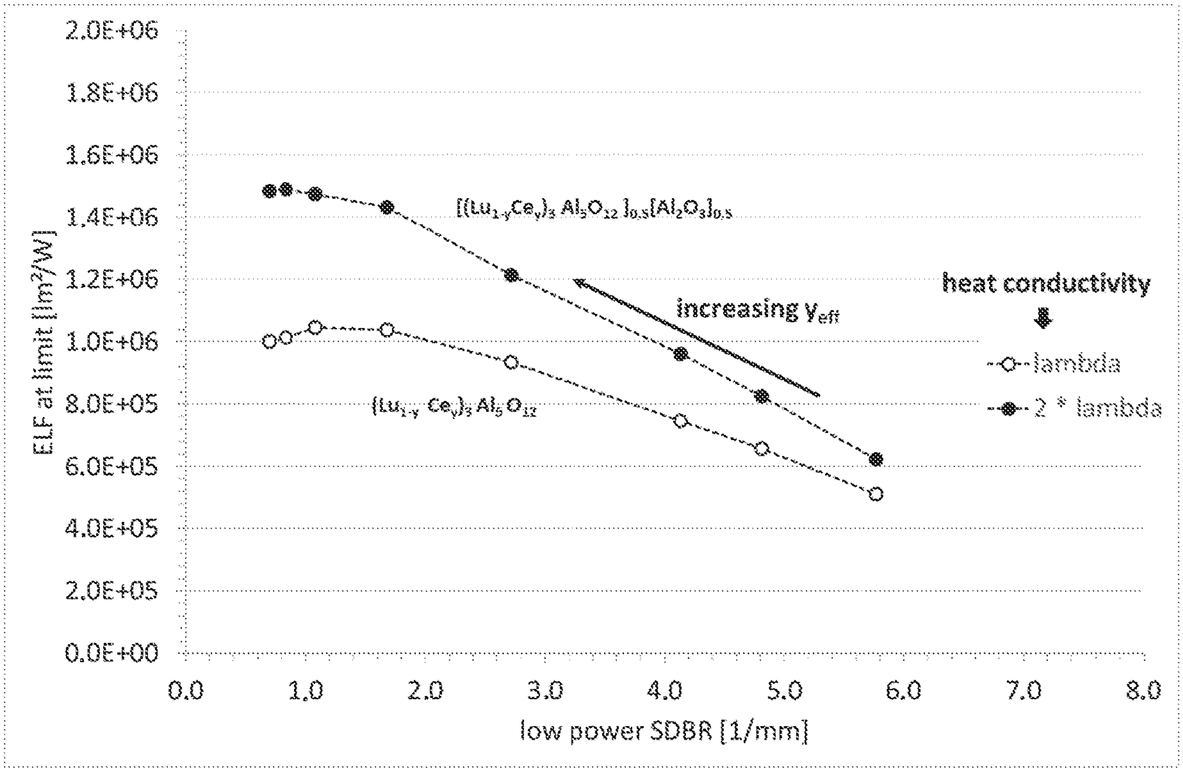
Figure 11D:
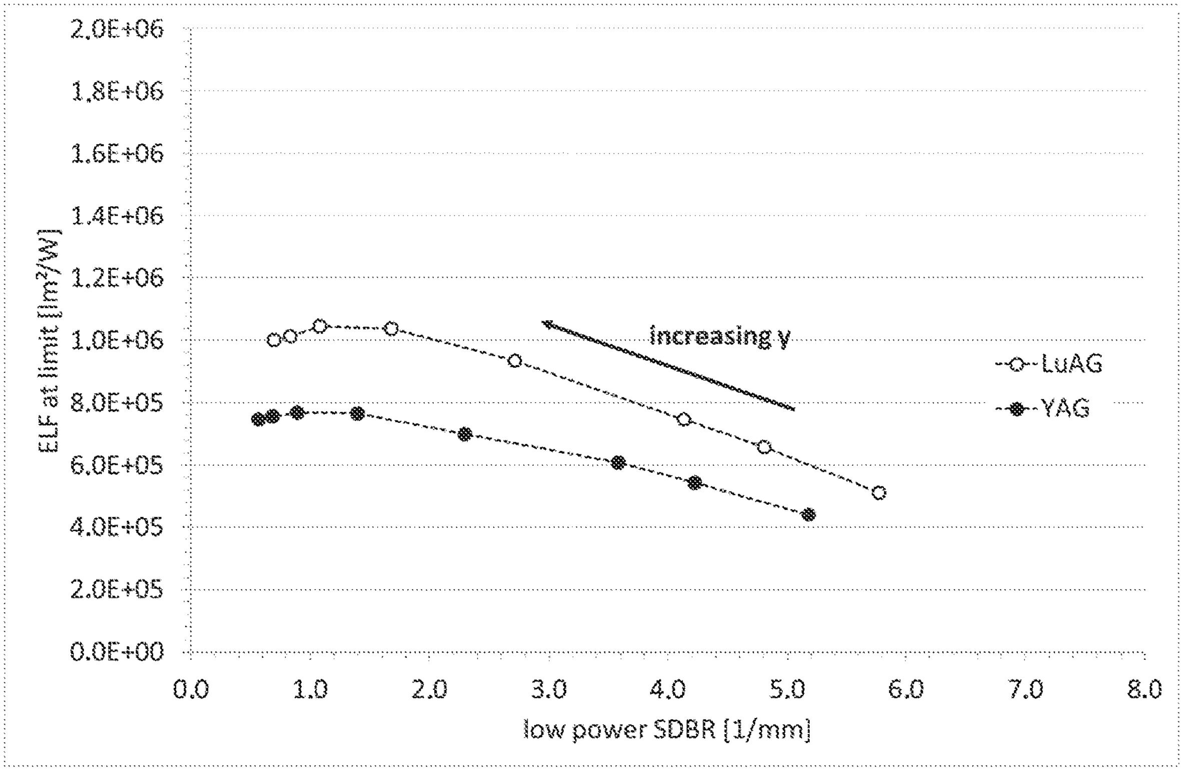
Figure 11E:
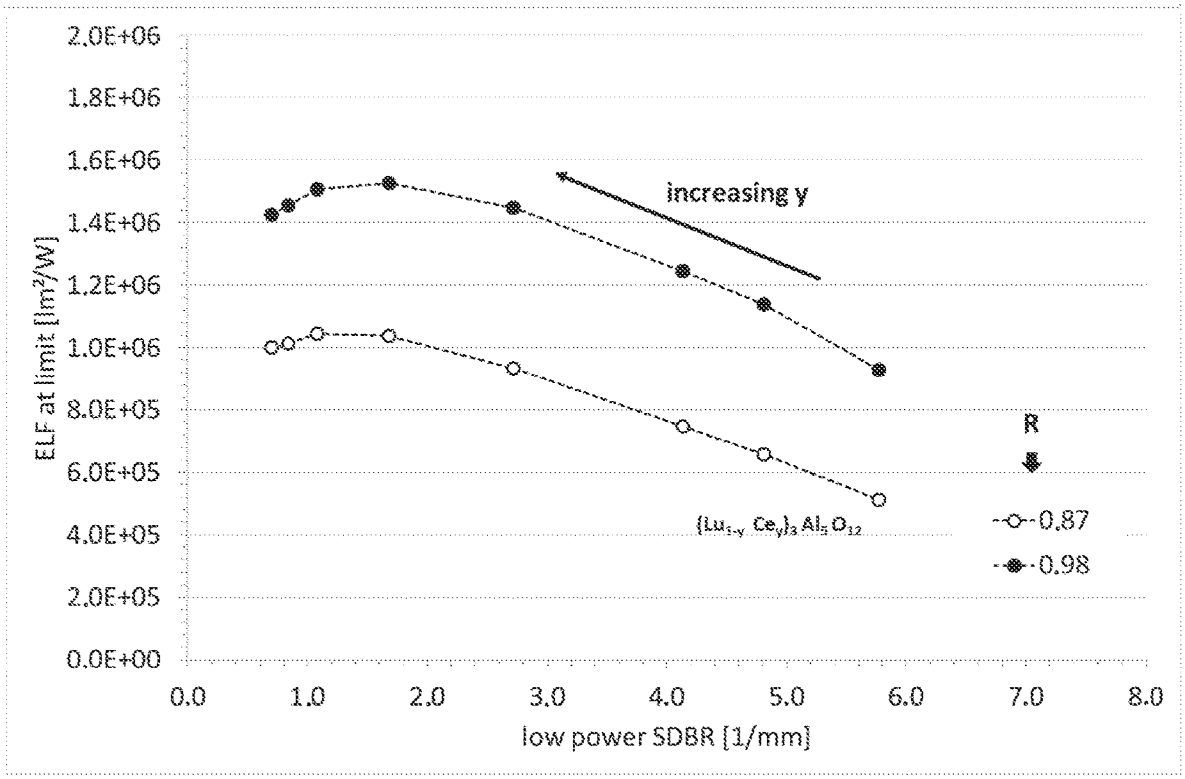

FIGS. 11A, 11B, 11C, 11D, and 11E show the dependence of efficient luminous flux at the irradiance limit for the same variations as in the previous figures. FIG. 11A: calculated ELF at the irradiance limit, for LuAG:Ce with coefficient of scatter s=350 $cm^{-1}$, at different thickness t, for various Ce contents y. FIG. 11B: calculated ELF at the irradiance limit, for LuAG:Ce with thickness t=80 μm, at different coefficient of scatter s, for various Ce contents y. FIG. 11C: calculated ELF at the irradiance limit, for LuAG:Ce by comparison with a mixed LuAG-Al2O3 ceramic, for thickness t=80 μm, coefficient of scatter s=350 $cm^{-1}$, for various (effective) Ce contents $y_{eff}$. FIG. 11D: calculated ELF at the irradiance limit, for LuAG:Ce by comparison with YAG:Ce, for thickness t=80 μm, coefficient of scatter s=350 $cm^{-1}$, for various Ce contents y. FIG. 11E: calculated ELF at the irradiance limit, for LuAG:Ce with thickness t=80 μm, coefficient of scatter s=350 $cm^{-1}$, at different rear-side reflectivity R, for various Ce contents y.

Specific diffuse (blue) reflectance SDR (SDBR) can be determined in a simple and non-destructive manner using a light conversion unit. This is largely independent of composition, thickness, scatter properties etc. SDR is an adjustable parameter of a light conversion unit.

SDR is optionally in the range of $0<SDR<3\ mm^{-1}$, optionally $0.5<SDR<2.5\ mm^{-1}$, optionally $0.8<SDBR<2\ mm^{-1}$.

As an example, Table 3 shows the measured samples #1 to #14, with the diffuse blue reflectance DBR determined in each case according to FIG. 8, the converter thickness t, and the specific diffuse blue reflectance SDBR (low power SDBR) formed therefrom.

TABLE 3

Measured diffuse blue reflectance DBR, converter thickness t, and specific diffuse blue reflectance SDBR calculated therefrom for different converter materials.

| No. | Material | x | y | z | $y_{eff}$ | DBR | t [μm] | SDBR [$mm^{-1}$] |
|---|---|---|---|---|---|---|---|---|
| #1 | $(Lu_{1-y}\ Ce_y)_3\ Al_5\ O_{12}$ | — | 0.0036 | — | 0.0036 | 0.074 | 80 | 0.93 |
| #2 | $(Lu_{1-y}\ Ce_y)_3\ Al_5\ O_{12}$ | — | 0.0036 | — | 0.0036 | 0.085 | 90 | 0.95 |
| #3 | $(Lu_{1-y}\ Ce_y)_3\ Al_5\ O_{12}$ | — | 0.0063 | — | 0.0063 | 0.043 | 80 | 0.54 |
| #4 | $(Lu_{1-y}\ Ce_y)_3\ Al_5\ O_{12}$ | — | 0.0063 | — | 0.0063 | 0.040 | 100 | 0.40 |
| #5 | $[(Lu_{1-y}Ce_y)_3\ Al_5O_{12}]_{1-z}[Al_2O_3]_z$ | — | 0.0050 | 0.05 | 0.0048 | 0.066 | 80 | 0.82 |
| #6 | $[(Lu_{1-y}Ce_y)_3\ Al_5O_{12}]_{1-z}[Al_2O_3]_z$ | — | 0.0050 | 0.05 | 0.0048 | 0.064 | 100 | 0.64 |
| #7 | $[(Lu_{1-y}Ce_y)_3\ Al_5O_{12}]_{1-z}[Al_2O_3]_z$ | — | 0.0063 | 0.5 | 0.0032 | 0.055 | 100 | 0.55 |
| #8 | $(Y_{1-y}\ Ce_y)_3\ Al_5\ O_{12}$ | 1 | 0.0030 | — | 0.0030 | 0.120 | 150 | 0.80 |
| #9 | $(Y_{1-x-y}\ Gd_x\ Ce_y)_3\ Al_5\ O_{12}$ | 0.055 | 0.0027 | — | 0.0027 | 0.137 | 150 | 0.92 |
| #10 | $(Y_{1-x-y}\ Gd_x\ Ce_y)_3\ Al_5\ O_{12}$ | 0.1 | 0.0024 | — | 0.0024 | 0.143 | 150 | 0.95 |
| #11 | $(Y_{1-x-y}\ Gd_x\ Ce_y)_3\ Al_5\ O_{12}$ | 0.05 | 0.0012 | — | 0.0012 | 0.198 | 150 | 1.32 |

TABLE 3-continued

Measured diffuse blue reflectance DBR, converter thickness t, and specific diffuse blue reflectance SDBR calculated therefrom for different converter materials.

| No. | Material | x | y | z | $y_{eff}$ | DBR | t [μm] | SDBR [$mm^{-1}$] |
|---|---|---|---|---|---|---|---|---|
| #12 | $(Y_{1-y}\,Ce_y)_3\,Al_5\,O_{12}$ | — | 0.0012 | — | 0.0012 | 0.201 | 150 | 1.34 |
| #13 | $(Y_{1-x-y}\,Gd_x\,Ce_y)_3\,Al_5\,O_{12}$ | 0.1 | 0.0012 | — | 0.0012 | 0.190 | 150 | 1.27 |
| #14 | $(Lu_{1-y}\,Ce_y)_3\,Al_5\,O_{12}$ | — | 0.0050 | — | 0.0050 | 0.054 | 100 | 0.54 |

For the production of these respective samples, powders of the pure oxides yttrium oxide, lutetium oxide, aluminium oxide, gadolinium oxide and cerium oxide were mixed according to the composition of the desired compound #1 to #14 and, after addition of ethanol, dispersing aids and compressing aids, and of grinding balls, they were finely ground in a drum by way of a roller bench. The slip was then dried by way of a rotary evaporator and then compressed uniaxially to give cylindrical green bodies. The green bodies were debindered at about 600 °C, followed by reactive sintering under air at about 1600 °C. (for several hours). The sintered bodies were sawn into wafers by way of a wire saw and then ground and polished to the desired thickness. Subsequently, the wafers were printed on the rear side by screenprinting with a solder glass-containing Ag thick-layer paste. The paste was fired at about 900 °C. The wafers were subjected to vapor deposition on the front side of an about 97 nm thin AR layer of SiO2. The wafers that had thus been coated on both sides were individualized by dicing into dies of the 4×4 $mm^2$ format. For bonding to an Au-plated Cu heat sink (20×20×3 format), an Ag sinter paste was applied by way of a dispenser in the center of the heat sink and a die was pressed on in each case, then this compound was sintered under air at about 200 °C for about 2 h.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A lighting device, comprising:

a light source configured for emitting a primary light; and a light conversion unit formed by or comprising a light conversion element comprising a material containing a proportion of at least one optically active element from a group of lanthanoids, wherein the light conversion element includes a front side, a rear side, and a thickness (t) that extends from the front side to the rear side, wherein the light conversion element is set up for an irradiation on the front side with the primary light ($I_0$), for a diffuse reflectance of the primary light ($I_{REM}$), for a specular reflection of the primary light ($I_{FRE}$), and for a diffuse emission of a secondary light ($I_{EM}$) with an altered wavelength compared to the primary light, and wherein the light conversion unit has a specific diffuse reflectance $SDR=t^{-1}\cdot I_{REM}/(I_0-I_{FRE})$, such that a luminous flux emitted by the light conversion unit at an irradiance limit of the light conversion unit with regard to a variation in the proportion of the at least one optically active element is at most 4 $mm^{-1}$ away from a maximum.

2. The lighting device according to claim 1, wherein the specific diffuse reflectance SDR of the light conversion unit is such that the luminous flux emitted by the light conversion unit at the irradiance limit of the light conversion unit with regard to the variation in the proportion of the at least one optically active element is at least 0.25 $mm^{-1}$ away from a maximum.

3. The lighting device according to claim 1, wherein the specific diffuse reflectance SDR of the light conversion unit is greater than 0.1 $mm^{-1}$.

4. The lighting device according to claim 1, wherein the specific diffuse reflectance SDR of the light conversion unit is less than 7 $mm^{-1}$.

5. The lighting device according to claim 1, wherein the light conversion unit has at least one highly reflective layer or coating.

6. The lighting device according to claim 5, wherein the light conversion unit includes at least one optical separation layer.

7. A lighting device according to claim 5, wherein the lighting device further includes an adhesion promoter layer beneath the at least one highly reflective layer.

8. The lighting device according to claim 1, wherein the light conversion unit further includes a substrate and a binder, the substrate being bonded directly or indirectly to the rear side of the light conversion element, the binder being between the light conversion element and the substrate, and wherein the binder is formed as at least one of an organic adhesive, at least one glass, at least one ceramic adhesive, at least one inorganic adhesive, at least one sintered sinter paste, and at least one metallic solder compound.

9. The lighting device according to claim 8, wherein a bond strength of the light conversion element on the substrate is greater than 1 MPa.

10. The lighting device according to claim 8, wherein the thickness (t) of the light conversion element is not more than 250 μm.

11. The lighting device according to claim 8, wherein the substrate at least one of (a) includes at least one ceramic, at least one metal, or at least one ceramic-metal composite, and (b) has a thermal conductivity of greater than 30 W/mK.

12. The lighting device according to claim 1, wherein the light conversion element consists wholly of or predominantly includes at least one material of a composition $(A_{1-y}C_y)_3B_5O_{12}$, with A being selected from at least one of Y, Lu, and Gd, with B being selected from at least one of Al and Ga, and with C being selected from the at least one optically active element from the lanthanoids.

13. The lighting device according to claim 1, wherein the material of the light conversion element is wholly or partly a ceramic.

14. The lighting device according to claim 1, wherein the light conversion element comprises a first component composed of at least one material of a composition $(A_{1-y}C_y)_3B_5O_{12}$, with A being selected from at least one of Y, Lu, and Gd, with B being selected from at least one of Al and Ga, and with C being selected from at least one of the lanthanoids, and wherein the light conversion element comprises a second component composed of a material having higher thermal conductivity.

15. The lighting device according to claim 1, wherein the material of the light conversion element includes a plurality of pores or a plurality of other light-scattering inclusions or particles.

16. The lighting device according to claim 1, wherein the lighting device includes:

the thickness (t) of the light conversion element being not more than 90 μm;

a coefficient of scatter(s) of the light conversion element, applicable to a wavelength of 600 nm, of $150\ cm^{-1}<s<550\ cm^{-1}$;

a thermal conductivity (1) of the light conversion element, applicable to a room temperature, of $5\ Wm^{-1}K^{-1}<1<15\ Wm^{-1}K^{-1}$; and a Ce content y of the light conversion element of $y_{eff}>0.0125$ at %.

17. The lighting device according to claim 1, wherein the lighting device includes:

the thickness (t) of the light conversion element being not more than 170 μm;

a coefficient of scatter(s) of the light conversion element, applicable to a wavelength of 600 nm, of $150\ cm^{-1}<s<550\ cm^{-1}$;

a color temperature (CCT)>5500 K; and a Ce content y of the light conversion element of $y_{eff}>0.025$ at %.

18. The lighting device according to claim 1, wherein the lighting device includes:

the thickness (t) of the light conversion element being not more than 170 μm;

a coefficient of scatter(s) of the light conversion element, applicable to a wavelength of 600 nm, of $150\ cm^{-1}<s<550\ cm^{-1}$;

a color temperature (CCT) of 4000<CCT <5500 K; and a Ce content y of the light conversion element of $y_{eff}>0.025$ at %.

19. A light conversion unit, comprising:

a light conversion element comprising a material containing a proportion of at least one optically active element from a group of lanthanoids, wherein the light conversion element includes a front side, a rear side, and a thickness (t) that extends from the front side to the rear side, wherein the light conversion element is set up for an irradiation on the front side with a primary light ($I_0$), for a diffuse reflectance of the primary light ($I_{REM}$), for a specular reflection of the primary light ($I_{FRE}$), and for a diffuse emission of a secondary light ($I_{EM}$) with an altered wavelength compared to the primary light, and wherein the light conversion unit has a specific diffuse reflectance $SDR=t^{-1}\cdot I_{REM}/(I_0-I_{FRE})$, which is selected such that a luminous flux emitted by the light conversion unit at an irradiance limit of the light conversion unit with regard to a variation in the proportion of the at least one optically active element is at most 4 $mm^{-1}$ away from a maximum.

20. The light conversion unit according to claim 19, wherein the light conversion unit is configured for being used, and wherein at least one of:

(a) the light conversion unit is configured for operating at a margin from the irradiance limit of the light conversion unit of less than 50 percent; and (b) the light conversion unit is configured for operating at a margin from the irradiance limit of the light conversion unit of greater than 5 percent.

* * * * *